(12) United States Patent
Shiraki et al.

(10) Patent No.: US 12,461,123 B2
(45) Date of Patent: Nov. 4, 2025

(54) OSCILLATION INFORMATION CALCULATION DEVICE, OSCILLATION INFORMATION CALCULATION METHOD, AND NON-TRANSITORY COMPUTER-READABLE RECORDING MEDIUM

(71) Applicant: Panasonic Intellectual Property Management Co., Ltd., Osaka (JP)

(72) Inventors: Yuta Shiraki, Osaka (JP); Hiroshi Fujiwara, Osaka (JP); Toru Tazawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 199 days.

(21) Appl. No.: 18/248,174

(22) PCT Filed: Dec. 23, 2021

(86) PCT No.: PCT/JP2021/047792
§ 371 (c)(1),
(2) Date: Apr. 6, 2023

(87) PCT Pub. No.: WO2022/138797
PCT Pub. Date: Jun. 30, 2022

(65) Prior Publication Data
US 2025/0076102 A1 Mar. 6, 2025

(30) Foreign Application Priority Data
Dec. 23, 2020 (JP) .................................. 2020-213146

(51) Int. Cl.
*G01P 21/00* (2006.01)
*G01H 1/00* (2006.01)
(Continued)

(52) U.S. Cl.
CPC ............. *G01P 21/00* (2013.01); *G01H 1/003* (2013.01); *G01P 15/18* (2013.01); *G05B 5/01* (2013.01);
(Continued)

(58) Field of Classification Search
CPC ....... G01P 21/00; G01P 15/18; G05B 19/404; G05B 19/4062; G05B 5/01;
(Continued)

(56) References Cited

U.S. PATENT DOCUMENTS 4,651,073 A * 3/1987 Shimizu ............... G05B 19/358
318/632
2006/0116786 A1 6/2006 Iwashita et al.
(Continued)

FOREIGN PATENT DOCUMENTS

JP H05-229795 A 9/1993
JP 06-138950 A 5/1994
(Continued)

OTHER PUBLICATIONS

Translation of JP2006155351.*
(Continued)

*Primary Examiner* — Helen C Kwok
(74) *Attorney, Agent, or Firm* — Rimon P.C.

(57) ABSTRACT

An oscillation information calculation device includes: a sensor information obtainer that obtains time series position information on a motor as detected by a position detector, and time series sensor information on a movable part as detected by a sensor attached to the movable part, the movable part being connected to the motor via a joint; and an information calculator that calculates and outputs at least one of oscillation presence/absence information, oscillation frequency information, or oscillation causal information, based on the time series position information and the time (Continued)

series sensor information, the oscillation presence/absence information indicating presence or absence of oscillation of the motor and the movable part, the oscillation frequency information indicating an oscillation frequency of the motor and the movable part, the oscillation causal information indicating a cause of the oscillation of the motor and the movable part.

10 Claims, 16 Drawing Sheets

(51) Int. Cl.
  *G01P 15/18* (2013.01)
  *G05B 5/01* (2006.01)
  *G05B 19/404* (2006.01)
  *G05B 19/4062* (2006.01)

(52) U.S. Cl.
  CPC ....... *G05B 19/404* (2013.01); *G05B 19/4062* (2013.01)

(58) Field of Classification Search
  CPC ........... G05B 2219/37388; G05B 2219/42321; G05B 2219/42329; G01H 1/003
  See application file for complete search history.

(56) References Cited

U.S. PATENT DOCUMENTS

| | | | |
|---|---|---|---|
| 2012/0130667 | A1 | 5/2012 | Fukushima et al. |
| 2015/0081095 | A1 | 3/2015 | Shiraki et al. |
| 2022/0413453 | A1* | 12/2022 | Takano ................. G06N 20/00 |
| 2023/0366932 | A1* | 11/2023 | Tanaka ............... G05B 19/4062 |

FOREIGN PATENT DOCUMENTS

| | | |
|---|---|---|
| JP | 2006-155351 A | 6/2006 |
| JP | 2010-166686 A | 7/2010 |
| JP | 2012-112789 A | 6/2012 |
| JP | 2019-185434 A | 10/2019 |
| WO | 2013/175553 A1 | 11/2013 |

OTHER PUBLICATIONS

Translation of JPH06138950.*
Translation of JP2010166686.*
International Search Report issued on Feb. 15, 2022 in International Patent Application No. PCT/JP2021/047792, with English translation.

* cited by examiner

FIG. 3

| Amplitude of filtered position information | Amplitude of filtered sensor information | Cause |
|---|---|---|
| First threshold or more | Second threshold or more | Resonance-based cause |
| First threshold or more | Less than second threshold | Resonance-based cause |
| Less than first threshold | Second threshold or more | Anti-resonance-based cause |
| Less than first threshold | Less than second threshold | None |

FIG. 4

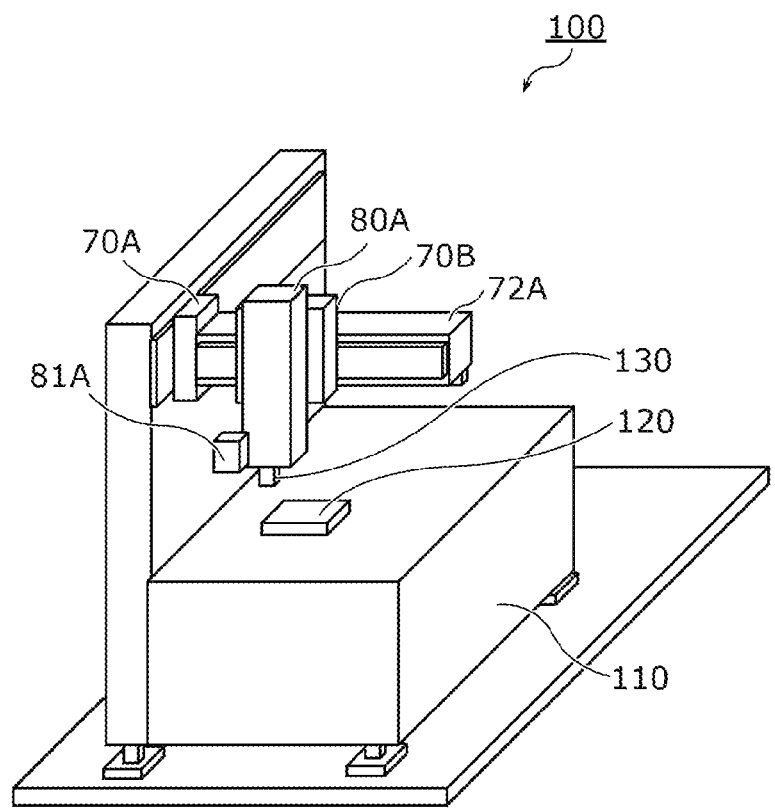

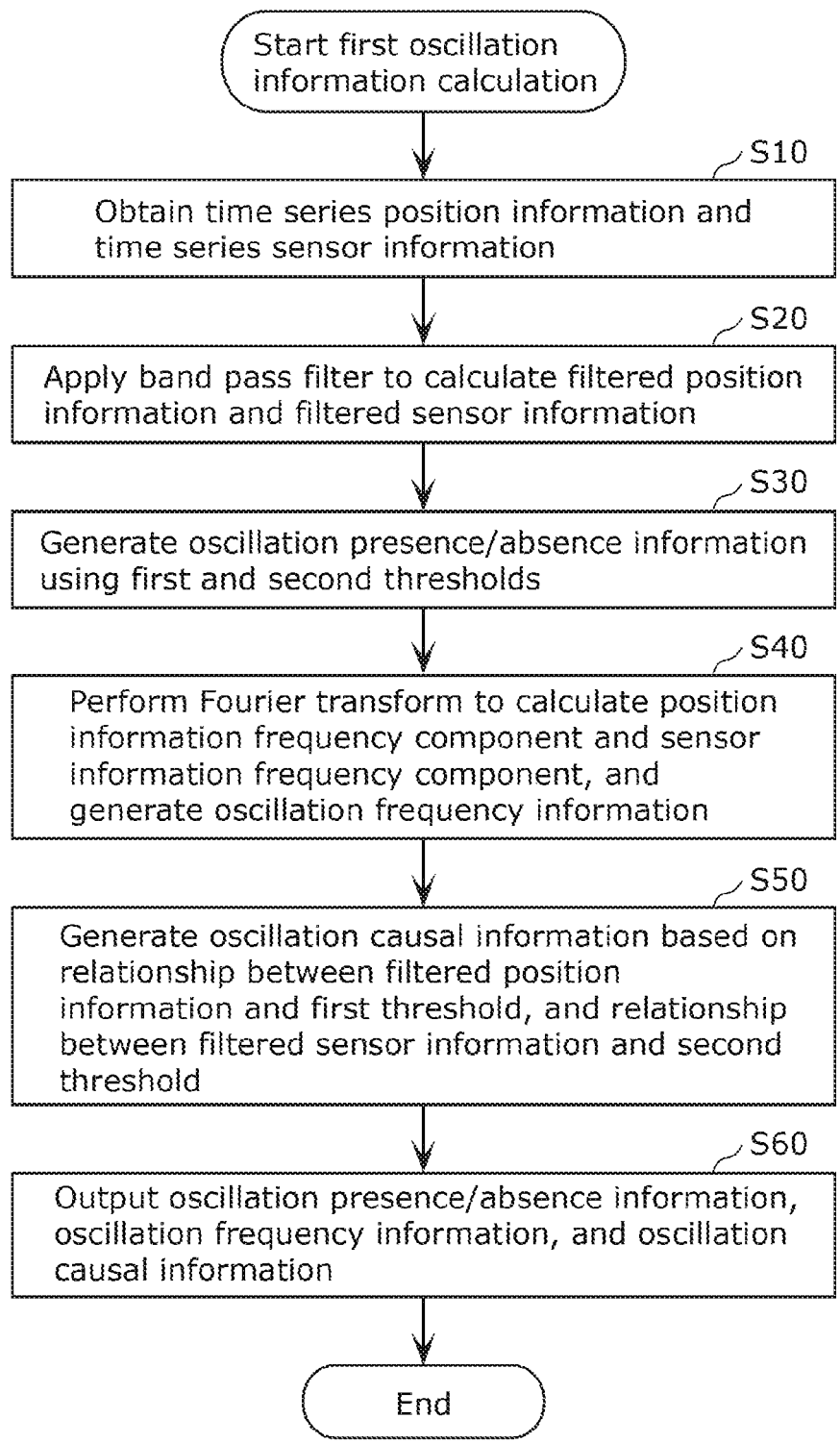

FIG. 8

| Spectrum peak of position information frequency component | Spectrum peak of sensor information frequency component | Cause |
|---|---|---|
| Third threshold or more | Fourth threshold or more | Resonance-based cause |
| Third threshold or more | Less than Fourth threshold | |
| Less than Third threshold | Fourth threshold or more | Anti-resonance-based cause |
| Less than Third threshold | Less than Fourth threshold | None |

FIG. 12

| Spectrum peak of position information frequency component | Spectrum peak of sensor information frequency component | Cause |
|---|---|---|
| Fifth threshold or more | Sixth threshold or more | Resonance-based cause |
| Fifth threshold or more | Less than Sixth threshold | |
| Less than Fifth threshold | Sixth threshold or more | Anti-resonance-based cause |
| Less than Fifth threshold | Less than Sixth threshold | None |

FIG. 16

| Amplitude of filtered position information | Amplitude of filtered sensor information | Cause |
|---|---|---|
| Seventh threshold or more | Eighth threshold or more | Resonance-based cause |
| Seventh threshold or more | Less than Eighth threshold | |
| Less than Seventh threshold | Eighth threshold or more | Anti-resonance-based cause |
| Less than Seventh threshold | Less than Eighth threshold | None |

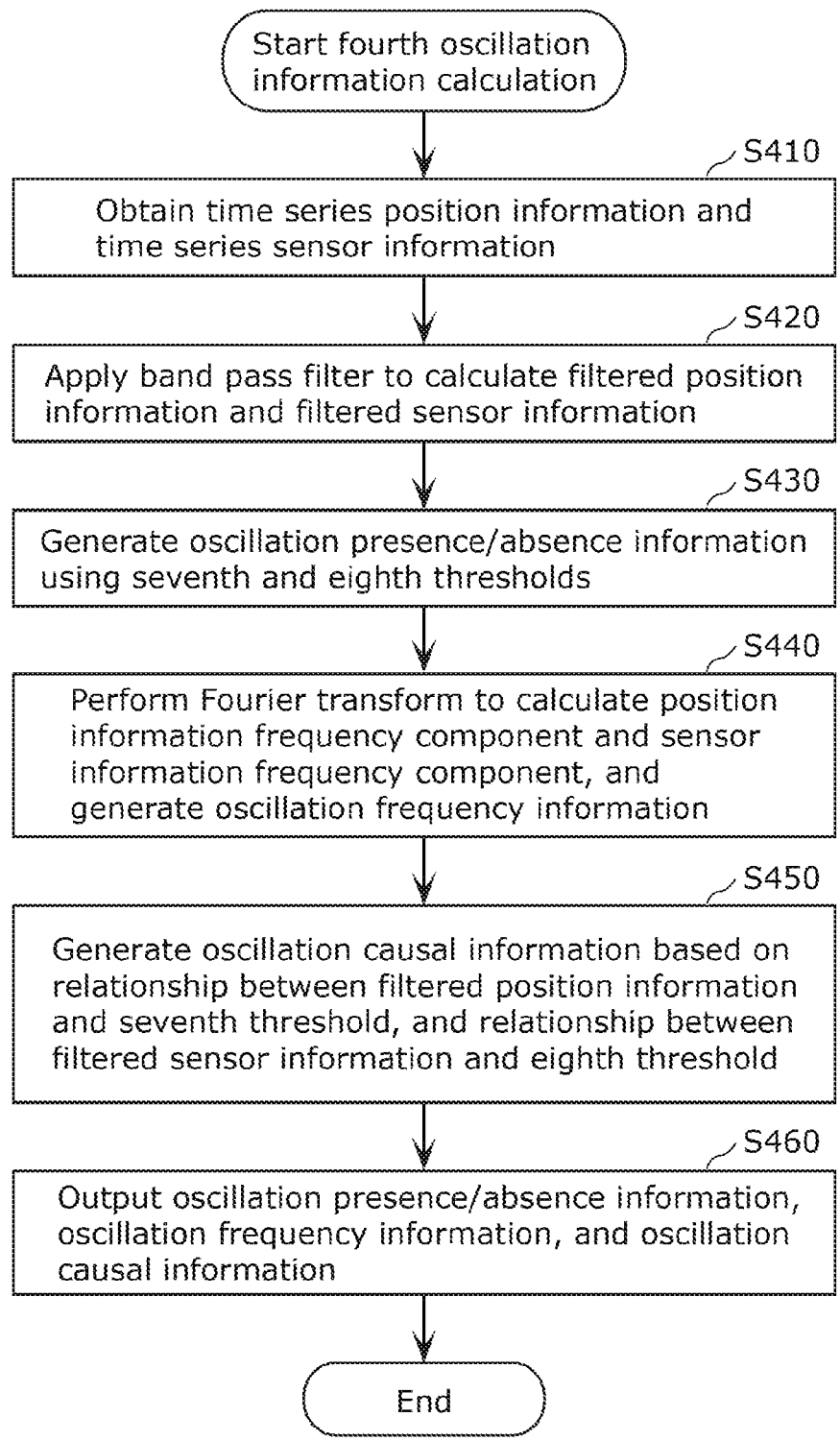

OSCILLATION INFORMATION CALCULATION DEVICE, OSCILLATION INFORMATION CALCULATION METHOD, AND NON-TRANSITORY COMPUTER-READABLE RECORDING MEDIUM

CROSS-REFERENCE OF RELATED APPLICATIONS

This application is the U.S. National Phase under 35 U.S.C. § 371 of International Patent Application No. PCT/JP2021/047792, filed on Dec. 23, 2021, which in turn claims the benefit of Japanese Patent Application No. 2020-213146, filed on Dec. 23, 2020, the entire disclosures of which Applications are incorporated by reference herein.

TECHNICAL FIELD

The present disclosure relates to an oscillation information calculation device that calculates information on oscillation.

BACKGROUND ART

Patent literature (PTL) 1 discloses an oscillation information calculation device that calculates information on oscillation.

The typical oscillation information calculation device calculates information on oscillation of a machine tool, based on information detected by a sensor attached to the machine tool.

CITATION LIST

Patent Literature

[PTL 1] Japanese Unexamined Patent Application Publication No. 2019-185434

SUMMARY OF INVENTION

Technical Problem

There is however room for improvement in the oscillation information calculation device disclosed in PTL 1.

It is thus an objective of the present disclosure to provide an oscillation information calculation device, for example, achieving a further improvement.

Solution to Problem

An oscillation information calculation device according to an aspect of the present disclosure includes: a sensor information obtainer that obtains time series position information on a motor as detected by a position detector, and time series sensor information on a movable part as detected by a sensor attached to the movable part, the movable part being connected to the motor via a joint; and an information calculator that calculates and outputs at least one of oscillation presence/absence information, oscillation frequency information, or oscillation causal information, based on the time series position information and the time series sensor information, the oscillation presence/absence information indicating presence or absence of oscillation of the motor and the movable part, the oscillation frequency information indicating an oscillation frequency of the motor and the movable part, the oscillation causal information indicating a cause of the oscillation of the motor and the movable part.

An oscillation information calculation method according to an aspect of the present disclosure includes: obtaining time series position information on a motor as detected by a position detector, and time series sensor information on a movable part as detected by a sensor attached to the movable part, the movable part being connected to the motor via a joint; and calculating and outputting at least one of oscillation presence/absence information, oscillation frequency information, or oscillation causal information, based on the time series position information and the time series sensor information, the oscillation presence/absence information indicating presence or absence of oscillation of the motor and the movable part, the oscillation frequency information indicating an oscillation frequency of the motor and the movable part, the oscillation causal information indicating a cause of the oscillation of the motor and the movable part.

A non-transitory computer-readable recording medium according to an aspect of the present disclosure has recorded thereon a program for causing an oscillation information calculation device to execute oscillation information calculation processing including: obtaining time series position information on a motor as detected by a position detector, and time series sensor information on a movable part as detected by a sensor attached to the movable part, the movable part being connected to the motor via a joint; and calculating and outputting at least one of oscillation presence/absence information, oscillation frequency information, or oscillation causal information, based on the time series position information and the time series sensor information, the oscillation presence/absence information indicating presence or absence of oscillation of the motor and the movable part, the oscillation frequency information indicating an oscillation frequency of the motor and the movable part, the oscillation causal information indicating a cause of the oscillation of the motor and the movable part.

Advantageous Effects of Invention

An oscillation information calculation device, for example, according to an aspect of the present disclosure achieves a further improvement.

BRIEF DESCRIPTION OF DRAWINGS

FIG. 3 is a schematic diagram showing generation conditions where the information calculator according to Embodiment 1 generates oscillation causal information.

FIG. 4 is a schematic view of production equipment employing the motor control system according to Embodiment 1.

FIG. 5 is a flowchart of first oscillation information calculation processing according to Embodiment 1.

FIG. 8 is a schematic diagram showing generation conditions where the information calculator according to Embodiment 2 generates oscillation causal information.

FIG. 12 is a schematic diagram showing generation conditions where the information calculator according to Embodiment 3 generates oscillation causal information.

FIG. 16 is a schematic diagram showing generation conditions where the information calculator according to Embodiment 4 generates oscillation causal information.

FIG. 17 is a flowchart of fourth oscillation information calculation processing according to Embodiment 4.

Figure 1:
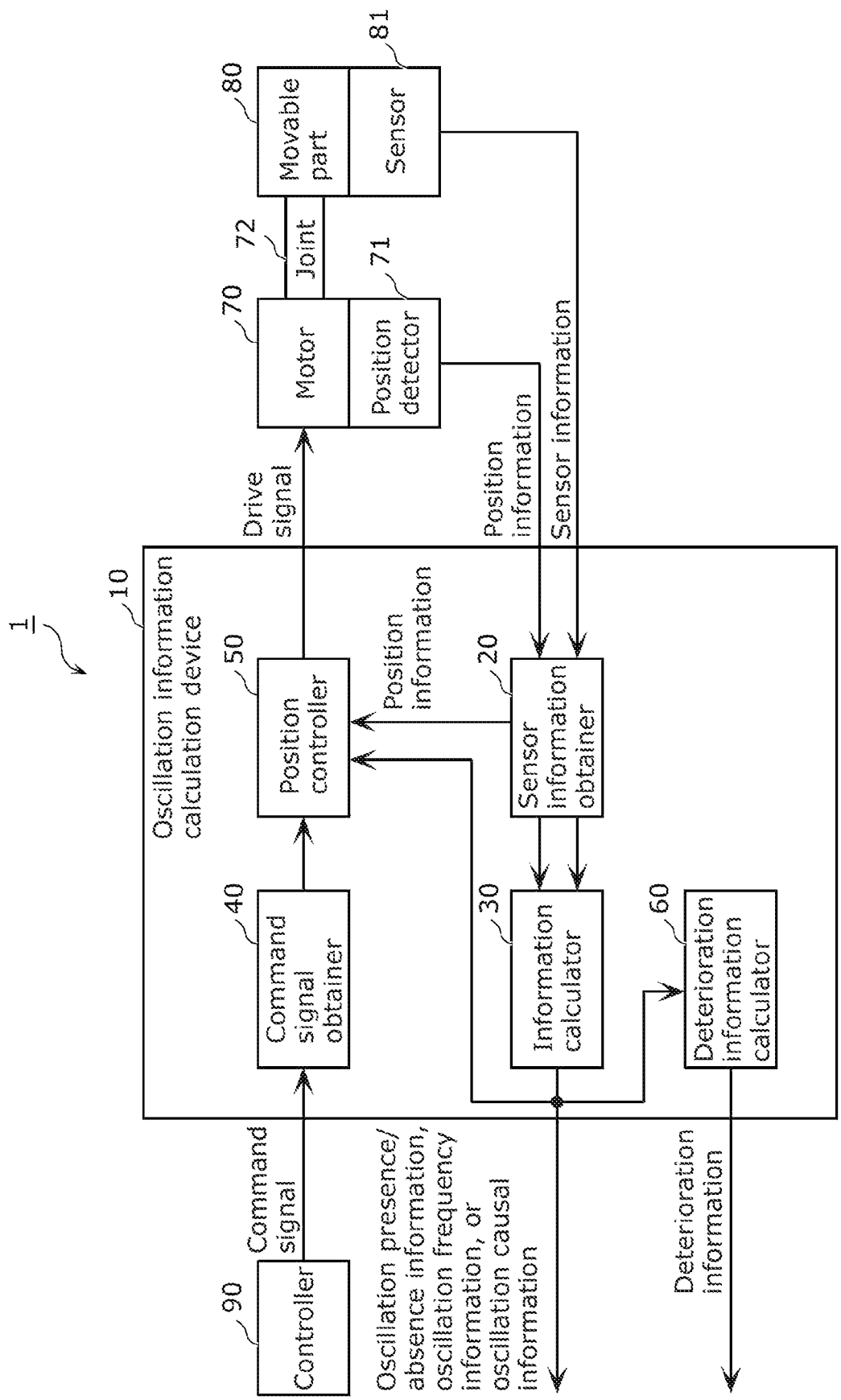
FIG. 1 is a block diagram showing a configuration of a motor control system according to Embodiment 1.

DESCRIPTION OF EMBODIMENTS (Circumstances Leading to the Present Disclosure)

A system moves a movable part to a target position by driving a motor connected to the movable part via a joint. Such a motor and the movable part may oscillate at a time of driving the motor due to aging of equipment or other causes.

The present inventors have found that there is a need to grasp at least one of the presence or absence of oscillation of the motor and the movable part, the oscillation frequency of the motor and the movable part, or the oscillation cause of the motor and the movable part in order to reduce such oscillation. Accordingly, after experiments and studies based on the finding, the present inventors have thought of the following oscillation information calculation device.

An oscillation information calculation device according to an aspect of the present disclosure includes: a sensor information obtainer that obtains time series position information on a motor as detected by a position detector, and time series sensor information on a movable part as detected by a sensor attached to the movable part, the movable part being connected to the motor via a joint; and an information calculator that calculates and outputs at least one of oscillation presence/absence information, oscillation frequency information, or oscillation causal information, based on the time series position information and the time series sensor information, the oscillation presence/absence information indicating presence or absence of oscillation of the motor and the movable part, the oscillation frequency information indicating an oscillation frequency of the motor and the movable part, the oscillation causal information indicating a cause of the oscillation of the motor and the movable part.

The oscillation information calculation device with the configuration described above allows a user of the oscillation information calculation device to grasp at least one of the presence or absence of oscillation of the motor and the movable part, the oscillation frequency of the motor and the movable part, or the oscillation cause of the motor and the movable part. Accordingly, this user can take a measurement to reduce oscillation of the motor and the movable part at a time of driving the motor in the system that moves the movable part to a target position by driving the motor connected to the movable part via the joint.

As described above, the typical oscillation information calculation device disclosed in PTL 1 calculates information on oscillation of a machine tool, based on information detected by a sensor attached to the machine tool.

By contrast, the oscillation information calculation device according to an aspect of the present disclosure calculates information on oscillation, based on the position information on the motor as detected by the position detector in addition to the sensor information on the movable part as detected by a sensor attached to the movable part.

Accordingly, an aspect of the present disclosure provides a further improved oscillation information calculation device.

The information calculator may calculate the at least one of the oscillation presence/absence information, the oscillation frequency information, or the oscillation causal information, further based on a predetermined threshold.

This configuration allows calculation of the at least one of the information using the threshold.

The oscillation information calculation device may further include: a command signal obtainer that obtains a command signal for moving the movable part to a target position; and a position controller that generates a drive signal for driving the motor to move the movable part to the target position, based on the command signal and the time series position information, and outputs the drive signal generated to the motor. The position controller may update a gain parameter for determining a gain of the drive signal relative to the command signal, based on the at least one of the oscillation presence/absence information, the oscillation frequency information, or the oscillation causal information.

The oscillation information calculation device with the configuration described above reduces this oscillation by updating a gain parameter based on the at least one of the information, when the motor and the movable part oscillate at a time of driving the motor in the system that moves the movable part to a target position by driving the motor connected to the movable part via a joint.

The information calculator may calculate the at least one of the oscillation presence/absence information, the oscillation frequency information, or the oscillation causal information in a first time period based on the time series position information on the motor as detected by the position detector in the first time period, and the time series sensor information on the movable part as detected by the sensor in the first time period, and calculate the at least one of the oscillation presence/absence information, the oscillation frequency information, or the oscillation causal information in a second time period before the first time period based on the time series position information on the motor as detected by the position detector in the second time period, and the time series sensor information on the movable part as detected by the sensor in the second time period. The oscillation information calculation device may further include a deterioration information calculator that calculates and outputs deterioration information on a deterioration of equipment including the motor and the movable part based on the at least one of the oscillation presence/absence information, the oscillation frequency information, or the oscillation causal information in the first time period and the at least one of the oscillation presence/absence information, the oscillation frequency information, or the oscillation causal information in the second time period.

This configuration allows a user of the oscillation information calculation device with the configuration described above to grasp the degree of the deterioration of equipment of the system that moves the movable part to a target position by driving the motor connected to the movable part via a joint.

The sensor may be an acceleration sensor that detects an acceleration of the movable part.

This configuration allows calculation of the at least one of the information using the acceleration sensor.

The sensor may detect a deviation of a position of the movable part from a target position of the movable part.

This configuration allows calculation of the at least one of the information based on a deviation of the position of the movable part from the target position.

The sensor may include an imaging device.

This configuration allows calculation of the at least one of the information using the imaging device.

The cause indicated by the oscillation causal information may include at least one of: a resonance-based cause arising from a resonance relationship between a command signal for moving the movable part to a target position and an oscillation frequency of equipment including the motor and the movable part; or an anti-resonance-based cause arising from an anti-resonance relationship between the command signal and the oscillation frequency.

This configuration allows a user of the oscillation information calculation device with the configuration described above to grasp that the cause is a resonance-based cause or an anti-resonance-based cause.

The sensor may be attached to the movable part at a point displaced when the movable part oscillates.

This configuration allows calculation of the at least one of the information more accurately.

An oscillation information calculation method according to an aspect of the present disclosure includes: obtaining time series position information on a motor as detected by a position detector, and time series sensor information on a movable part as detected by a sensor attached to the movable part, the movable part being connected to the motor via a joint; and calculating and outputting at least one of oscillation presence/absence information, oscillation frequency information, or oscillation causal information, based on the time series position information and the time series sensor information, the oscillation presence/absence information indicating presence or absence of oscillation of the motor and the movable part, the oscillation frequency information indicating an oscillation frequency of the motor and the movable part, the oscillation causal information indicating a cause of the oscillation of the motor and the movable part.

The oscillation information calculation method allows a user of the oscillation information calculation method to grasp at least one of the presence or absence of oscillation of the motor and the movable part, the oscillation frequency of the motor and the movable part, or the oscillation cause of the motor and the movable part. Accordingly, this user can take a measurement to reduce oscillation of the motor and the movable part at a time of driving the motor in the system that moves the movable part to a target position by driving the motor connected to the movable part via the joint.

As described above, the typical oscillation information calculation device disclosed in PTL 1 calculates information on oscillation of a machine tool, based on information detected by a sensor attached to the machine tool.

By contrast, the oscillation calculation method according to an aspect of the present disclosure includes calculating information on oscillation, based on the position information on the motor as detected by the position detector in addition to the sensor information on the movable part as detected by a sensor attached to the movable part.

Accordingly, the oscillation calculation method according to an aspect of the present disclosure provides a further improved oscillation information calculation device.

A non-transitory computer-readable recording medium according to an aspect of the present disclosure has recorded thereon a program for causing an oscillation information calculation device to execute oscillation information calculation processing including: obtaining time series position information on a motor as detected by a position detector, and time series sensor information on a movable part as detected by a sensor attached to the movable part, the movable part being connected to the motor via a joint; and calculating and outputting at least one of oscillation presence/absence information, oscillation frequency information, or oscillation causal information, based on the time series position information and the time series sensor information, the oscillation presence/absence information indicating presence or absence of oscillation of the motor and the movable part, the oscillation frequency information indicating an oscillation frequency of the motor and the movable part, the oscillation causal information indicating a cause of the oscillation of the motor and the movable part.

The non-transitory computer-readable recording medium allows a user of the program to grasp at least one of the presence or absence of oscillation of the motor and the movable part, the oscillation frequency of the motor and the movable part, or the oscillation cause of the motor and the movable part. Accordingly, this user can take a measurement to reduce oscillation of the motor and the movable part at a time of driving the motor in the system that moves the movable part to a target position by driving the motor connected to the movable part via the joint.

As described above, the typical oscillation information calculation device disclosed in PTL 1 calculates information on oscillation of a machine tool, based on sensor information detected by a sensor attached to the machine tool.

By contrast, the non-transitory computer-readable recording medium according to an aspect of the present disclosure includes calculating information on oscillation, based on the position information on the motor as detected by the position detector in addition to the sensor information on the movable part as detected by a sensor attached to the movable part.

Accordingly, the non-transitory computer-readable recording medium according to an aspect of the present disclosure provides a further improved oscillation information calculation device.

Now, specific examples of an oscillation information calculation device according to an aspect of the present disclosure will be described with reference to the drawings. The embodiments described below are mere specific examples of the present disclosure. The numerical values, shapes, constituent elements, the arrangement and connection of the constituent elements, steps, step orders etc. shown in the following embodiments are thus mere examples, and are not intended to limit the scope of the present disclosure. The figures are schematic representations and not necessarily drawn strictly to scale. In the following description, the same reference signs are used to represent substantially the same configurations in the drawings and redundant description will be omitted or simplified.

Embodiment 1

Now, a motor control system according to Embodiment 1 will be described. This motor control system controls a motor and moves a movable part, which is connected to the motor, to a target position. This motor control system may be production equipment including a part mounted on a substrate, for example.

Configuration

FIG. 1 is a block diagram showing a configuration of motor control system 1 according to Embodiment 1.

As shown in FIG. 1, motor control system 1 includes oscillation information calculation device 10, motor 70, joint 72, movable part 80, controller 90, position detector 71, and sensor 81.

Motor 70 is driven by a drive signal output from oscillation information calculation device 10. An example will be described here where motor 70 is a rotary motor. However, motor 70 is not necessarily a rotary motor but may be a linear motor, for example.

The drive signal is a current for rotating motor 70, for example.

Position detector 71 detects the position of motor 70 and outputs time series position information indicating the detected position of motor 70 to oscillation information calculation device 10.

Position detector 71 may be an encoder, for example. In this case, the time series position information output by position detector 71 serves as a time series encoder signal.

Movable part 80 is connected to motor 70 via joint 72. For example, if motor control system 1 is production equipment including a part mounted on a substrate, movable part 80 is a header that transfers the part to the mounting position.

Joint 72 is a part with stiffness for connecting motor 70 and movable part 80. Joint 72 may warp in accordance with the motion of motor 70 and/or the motion of movable part 80. Due to this warpage, motor 70 and/or movable part 80 may oscillate.

Controller 90 generates a command signal for moving movable part 80 to a target position and outputs the generated command signal to oscillation information calculation device 10. The command signal may be, for example, a position command signal indicating a position command for moving movable part 80 to a target position, or a speed command signal indicating a speed command for moving movable part 80 to a target position. Alternatively, the command signal may be an acceleration command signal indicating an acceleration command for moving movable part 80 to a target position, or a torque command signal indicating a torque command for moving movable part 80 to a target position.

Sensor 81 is attached to movable part 80 to detect the physical quantity of movable part 80 and output time series sensor information, which indicates the detected physical quantity of movable part 80, to oscillation information calculation device 10.

Sensor 81 may be, for example, an acceleration sensor that detects the acceleration of movable part 80 as the physical quantity of movable part 80. Alternatively, sensor 81 may be, for example, a position sensor that detects a deviation of movable part 80 from a target position as the physical quantity of movable part 80. In this case, sensor 81 may include an imaging device, for example. In this case, for example, this imaging device captures an image within an imaging range. If the imaging range includes the target position, sensor 81 performs image processing on the captured image so as to calculate the deviation of movable part 80 from the target position.

In one preferred embodiment, sensor 81 is attached to movable part 80 at a point displaced when movable part 80 oscillates. For example, when movable part 80 oscillates, a node of the oscillation appears at a specific point of movable part 80 and an antinode of the oscillation appears at another specific point of movable part 80. In this case, sensor 81 is attached to movable part 80 at the point, at which the antinode appears, in one preferred embodiment. The attachment of sensor 81 at such a point allows more effective detection of the physical quantity of movable part 80 caused by the oscillation of movable part 80.

An example has been described in Embodiment 1 where sensor 81 is an acceleration sensor that detects the acceleration of movable part 80 as the physical quantity of movable part 80.

Oscillation information calculation device 10 receives the command signal, the position information, and the sensor information, and outputs (1) at least one of oscillation presence/absence information, oscillation frequency information, or oscillation causal information, (2) deterioration information on a deterioration of equipment including motor 70 and movable part 80, and (3) a drive signal. The oscillation presence/absence information indicates the presence or absence of oscillation of motor 70 and movable part 80. The oscillation frequency information indicates the oscillation frequency of motor 70 and movable part 80. The oscillation causal information indicates a cause of the oscillation of motor 70 and movable part 80. Here, for example, assume that motor control system 1 is production equipment including a part mounted on a substrate. In this case, the "deterioration information on a deterioration of equipment including motor 70 and movable part 80" may be information indicating the degree of aging of the production equipment, information indicating a request for changing a specific part of the production equipment, or information indicating a need for inspection of the production equipment.

Oscillation information calculation device 10 may be, for example, a computer device including a processor, a memory, and an input/output interface. The processor executes programs stored in the memory. Alternatively, oscillation information calculation device 10 may be a dedicated hardware circuit, for example. Oscillation information calculation device 10 may be a combination of a dedicated hardware circuit and a computer device including a processor that executes programs stored in a memory.

Oscillation information calculation device 10 includes sensor information obtainer 20, information calculator 30, command signal obtainer 40, position controller 50, and deterioration information calculator 60.

Sensor information obtainer 20 obtains time series position information output from position detector 71 and time series sensor information output from sensor 81.

Information calculator 30 calculates and outputs at least one of oscillation presence/absence information, oscillation frequency information, or oscillation causal information, based on the time series position information and time series sensor information obtained by sensor information obtainer 20.

An example will be described here where information calculator 30 calculates and outputs oscillation presence/absence information, oscillation frequency information, and oscillation causal information.

Figure 2:
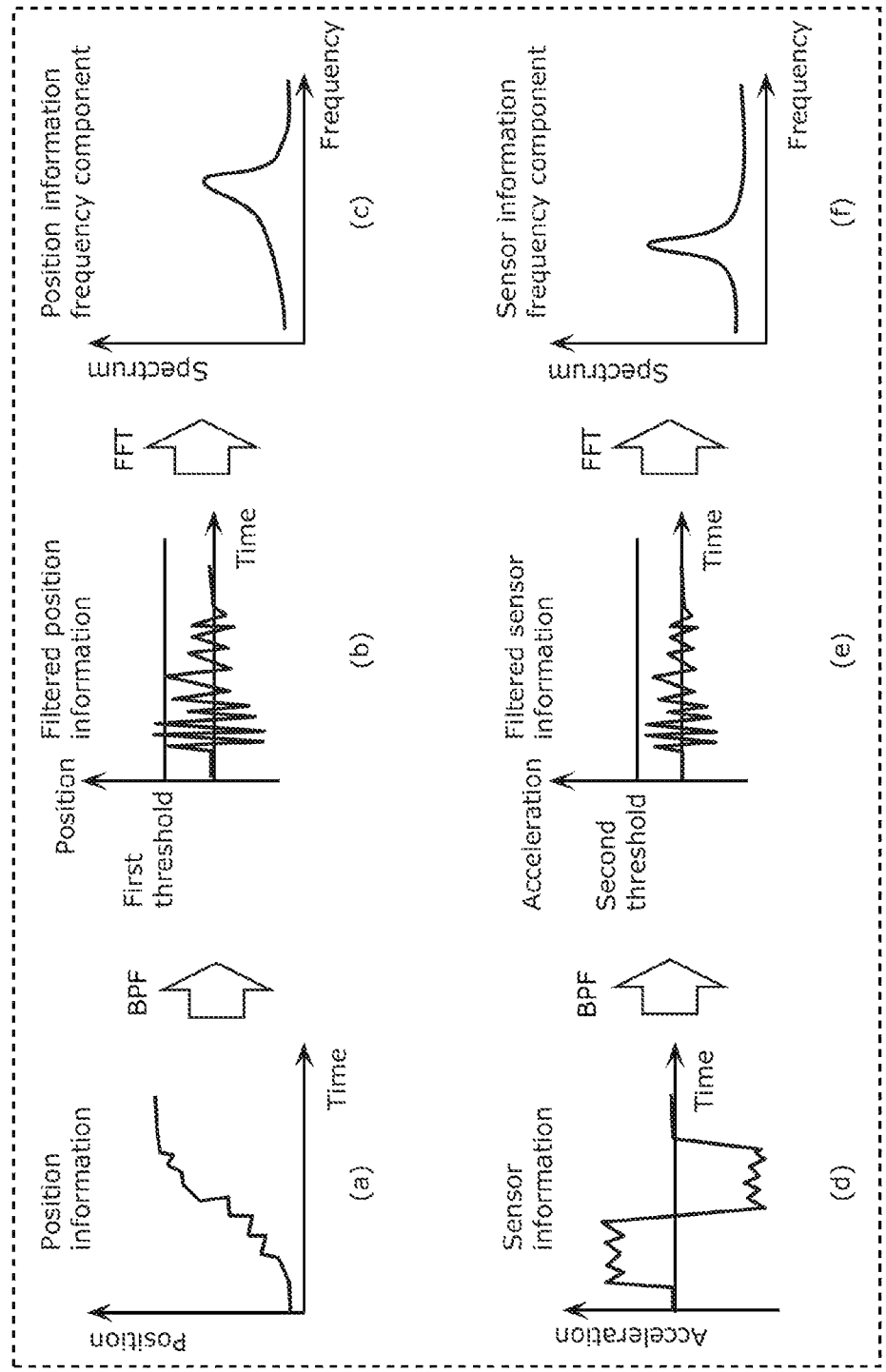
FIG. 2 is a schematic diagram showing that an information calculator according to Embodiment 1 calculates oscillation presence/absence information, oscillation frequency information, and oscillation causal information.

FIG. 2 is a schematic diagram showing that information calculator 30 calculates oscillation presence/absence information, oscillation frequency information, and oscillation causal information, based on time series position information and time series sensor information.

In FIG. 2, (a) schematically shows an example of the time series position information obtained by sensor information obtainer 20. In FIG. 2, (d) schematically shows an example of the time series sensor information obtained by sensor information obtainer 20.

Information calculator 30 applies a band pass filter, which allows a specific frequency component to pass, to the time series position information obtained by sensor information obtainer 20 to calculate filtered position information.

Here, the specific frequency component is the frequency range of the oscillation targeted when calculating the oscillation presence/absence information, the oscillation frequency information, and the oscillation causal information. The specific frequency may be a frequency range of oscillation of, for example, equipment employing motor control system 1, that is, equipment including motor 70 and movable part 80. In this case, this frequency range may be determined based on a result of experiment or simulation performed in advance using this equipment or may be determined based on required performance of this equipment.

In FIG. 2, (b) schematically shows an example of the filtered position information calculated by information calculator 30.

Information calculator 30 checks whether the amplitude according to the calculated filtered position information is greater than or equal to a first threshold.

In FIG. 2, (b) shows an example where the amplitude according to the calculated filtered position information is greater than or equal to the first threshold.

Here, the first threshold is for determining whether the time series position information contains an oscillation component. For example, the first threshold may be determined based on a result of experiment or simulation performed in advance using equipment employing motor control system 1 or may be determined based on required performance of this equipment.

Information calculator 30 performs the Fourier transform on the calculated filtered position information to calculate a position information frequency component.

In FIG. 2, (c) schematically shows an example of the position information frequency component calculated by information calculator 30.

Information calculator 30 applies a band pass filter, which allows a specific frequency component to pass, to the time series sensor information obtained by sensor information obtainer 20 to calculate filtered sensor information.

In FIG. 2, (e) schematically shows an example of the filtered sensor information calculated by information calculator 30.

Information calculator 30 checks whether the amplitude according to the calculated filtered sensor information is greater than or equal to a second threshold.

In FIG. 2, (e) shows an example where the amplitude according to the calculated filtered sensor information is not greater than or equal to the second threshold.

Here, the second threshold is for determining whether the time series sensor information contains an oscillation component. For example, the second threshold may be determined based on a result of experiment or simulation performed in advance using equipment employing motor control system 1 or may be determined based on required performance of this equipment.

Information calculator 30 performs the Fourier transform on the calculated filtered sensor information to calculate a sensor information frequency component.

In FIG. 2, (f) schematically shows an example of the sensor information frequency component calculated by information calculator 30.

Assume that the amplitude according to the calculated filtered position information is greater than or equal to the first threshold, and/or the amplitude according to the calculated filtered sensor information is greater than or equal to the second threshold. In this case, information calculator 30 generates and outputs oscillation presence/absence information indicating the presence of oscillation of motor 70 and movable part 80. Otherwise, information calculator 30 generates and outputs oscillation presence/absence information indicating the absence of oscillation of motor 70 and movable part 80.

Information calculator 30 generates and outputs oscillation frequency information indicating, as the oscillation frequency of motor 70 and movable part 80, the frequencies of the spectrum peaks of the calculated position information frequency component and the calculated sensor information frequency component.

Information calculator 30 generates oscillation causal information based on the relationship between the filtered position information and the first threshold, and the relationship between the filtered sensor information and the second threshold.

FIG. 3 is a schematic diagram showing generation conditions where information calculator 30 generates oscillation causal information.

Assume that the amplitude according to the calculated filtered position information is greater than or equal to the first threshold. In this case, as shown in FIG. 3, information calculator 30 generates and outputs oscillation causal information. The oscillation causal information indicates that the cause of the oscillation of motor 70 and movable part 80 is a resonance-based cause arising from a resonance relationship between a command signal and the oscillation frequency of the equipment employing motor control system 1.

Assume that the amplitude according to the calculated filtered position information is not greater than or equal to the first threshold and the amplitude according to the calculated filtered sensor information is greater than or equal to the second threshold. In this case, information calculator 30 generates and outputs oscillation causal information. The oscillation causal information indicates that the cause of the oscillation of motor 70 and movable part 80 is an anti-resonance-based cause arising from an anti-resonance relationship between a command signal and the oscillation frequency of the equipment employing motor control system 1.

Assume that the amplitude according to the calculated filtered position information is not greater than or equal to the first threshold and the amplitude according to the calculated filtered sensor information is not greater than or equal to the second threshold. In this case, information calculator 30 generates and outputs oscillation causal information indicating that there is no cause of the oscillation of motor 70 and movable part 80.

Referring back to FIG. 1, description of motor control system 1 will be continued.

Command signal obtainer 40 obtains a command signal output from controller 90.

Position controller 50 generates a drive signal for driving motor 70 to move movable part 80 to a target position, based on the command signal obtained by command signal obtainer 40 and the position information obtained by sensor information obtainer 20. Position controller 50 then outputs the generated drive signal to motor 70.

Position controller 50 may generate a drive signal by feedback control of feeding back the position information obtained by sensor information obtainer 20 in response to the command signal obtained by command signal obtainer 40, for example.

Assume that information calculator 30 calculates at least one of oscillation presence/absence information, oscillation frequency information, or oscillation causal information. In this case, position controller 50 also updates a gain parameter for determining the gain of the drive signal relative to the command signal, based on the at least one of the information. In this case, position controller 50 may update a gain parameter to reduce oscillation of motor 70 and movable part 80, for example.

Deterioration information calculator 60 calculates and outputs deterioration information on a deterioration of equipment including motor 70 and movable part 80. More specifically, deterioration information calculator 60 calculates and outputs the deterioration information, based on the at least one of the information in a first time period and in a second time period before the first time period, where information calculator 30 performs the following calculations. (1) Information calculator 30 calculates at least one of oscillation presence/absence information, oscillation frequency information, or oscillation causal information in the first time period, based on the following information. One of the information is time series position information on motor 70 as detected by position detector 71 in the first time period. The other is time series sensor information on movable part 80 as detected by sensor 81 in the first time period. (2) Information calculator 30 calculates the at least one of the information in the second time period, based on the following information. One of the information is time series position information on motor 70 as detected by position detector 71 in the second time period. The other is time series sensor information on movable part 80 as detected by sensor 81 in the second time period.

[Example Application]

Now, an example application of motor control system 1 with the configuration described above will be described.

FIG. 4 is a schematic view of production equipment 100 employing motor control system 1. This production equipment 100 is a part mounting machine including part 130 mounted on substrate 120 that is placed on machine stand 110.

As shown in FIG. 4, production equipment 100 includes header 80A, motor 70A, and motor 70B. Header 80A transfers part 130 to a mounting position. Motors 70A and 70B are for moving header 80A along the X- and Y-axes, respectively, in a plan view of machine stand 110. Here, header 80A is connected to motor 70A via arm 72A and motor 70B. Attached to the header is acceleration sensor 81A.

In production equipment 100, motor 70A corresponds to motor 70 in motor control system 1, header 80A corresponds to movable part 80 in motor control system 1, arm 72A and motor 70B correspond to joint 72 in motor control system 1, and acceleration sensor 81A corresponds to sensor 81 in motor control system 1.

The cause of oscillation in production equipment 100 includes (1) a resonance-based cause, (2) an anti-resonance-based cause, and (3) a machine stand oscillation-based cause. In the resonance-based cause, a command signal and the oscillation frequency of production equipment 100 (particularly, the oscillation frequency of the region including motor 70A, arm 72A, motor 70B, header 80A, and acceleration sensor 81A) have a resonance relationship. In the anti-resonance-based cause, a command signal and the oscillation frequency of production equipment 100 (particularly, the oscillation frequency of the region including motor 70A, arm 72A, motor 70B, header 80A, and acceleration sensor 81A) have an anti-resonance relationship. The machine stand oscillation-based cause is caused by oscillation of the machine stand.

Now, Embodiment 1 will be described where production equipment 100 employs motor control system 1.

Operation

Now, an operation performed by oscillation information calculation device 10 with the configuration described above will be described.

Oscillation information calculation device 10 performs first oscillation information calculation processing of calculating and outputting at least one of oscillation presence/absence information, oscillation frequency information, and signal-based cause information, based on time series position information and time series sensor information.

An example will be described here where the first oscillation information processing is processing of calculating and outputting oscillation presence/absence information, oscillation frequency information, and oscillation causal information by information calculator 30.

The first oscillation information calculation processing starts, for example, when position detector 71 outputs time series position information and sensor 81 outputs time series sensor information.

FIG. 5 is a flowchart of the first oscillation information calculation processing performed by oscillation information calculation device 10.

As shown in FIG. 5, after the start of the first oscillation information calculation processing, sensor information obtainer 20 obtains the time series position information output from position detector 71 and the time series sensor information output from sensor 81 (step S10).

After the obtainment of the time series position information and the time series sensor information, information calculator 30 applies a band pass filter, which allows a specific frequency component to pass, to the time series position information and the time series sensor information to calculate filtered position information and filtered sensor information (step 20).

After calculating the filtered sensor information and the filtered position information, information calculator 30 conducts the following checks and generates oscillation presence/absence information (step S30). One of the checks is as to whether the amplitude according to the filtered position information is greater than or equal to the first threshold. The other is as to whether the amplitude according to the filtered sensor information is greater than or equal to the second threshold.

After generating the oscillation presence/absence information, information calculator 30 performs the Fourier transform on the filtered position information and the filtered sensor information to calculate a position information frequency component and a sensor information frequency component. Information calculator 30 then generates oscillation frequency information indicating the frequencies of the spectrum peaks of the calculated information frequency component and the calculated sensor information frequency component (step S40).

After generating the oscillation frequency information, information calculator 30 generates the following information (step S50). Assume that the amplitude according to the filtered position information is greater than or equal to the first threshold. In this case, information calculator 30 generates oscillation causal information indicating a resonance-based cause. Assume that the amplitude according to the filtered position information is not greater than or equal to the first threshold and the amplitude according to the filtered sensor information is greater than or equal to the second threshold. In this case, information calculator 30 generates oscillation causal information indicating an anti-resonance-based cause. Assume that the amplitude according to the filtered position information is not greater than or equal to the first threshold and the amplitude according to the filtered sensor information is not greater than or equal to the second threshold. In this case, information calculator 30 generates oscillation causal information indicating that there is no cause.

After generating the oscillation presence/absence information, the oscillation frequency information, and the signal-based cause information, information calculator 30 outputs the generated oscillation presence/absence information, oscillation frequency information, and signal-based cause information (step S60).

After the end of the processing in step S60, oscillation information calculation device 10 ends its first oscillation information calculation processing.

Study

As described above, oscillation information calculation device 10 with the configuration described above outputs at least one of oscillation presence/absence information, oscillation frequency information, or oscillation causal information. The oscillation presence/absence information indicates the presence or absence of oscillation of motor 70 and movable part 80. The oscillation frequency information indicates the oscillation frequency of motor 70 and movable part 80. The oscillation causal information indicates the cause of the oscillation of motor 70 and movable part 80. This configuration allows a user of oscillation information calculation device 10 to grasp at least one of the presence or absence of oscillation of motor 70 and movable part 80, the oscillation frequency of motor 70 and movable part 80, or the cause of the oscillation of motor 70 and movable part 80. Accordingly, this user can take a measurement to reduce oscillation of motor 70 and movable part 80 at a time of driving motor 70 in a system that moves movable part 80 to a target position by driving motor 70 connected to movable part 80 via joint 72.

Embodiment 2

Described below is a motor control system according to Embodiment 2 obtained by partially modifying motor control system 1 according to Embodiment 1.

The components of the motor control system according to Embodiment 2, which are the same as those of motor control system 1 according to Embodiment 1, are regarded as being described already. In the following description, the same reference signs are used to represent substantially the same components and detailed description thereof will be omitted. Differences from motor control system 1 will be described mainly.

Figure 6:
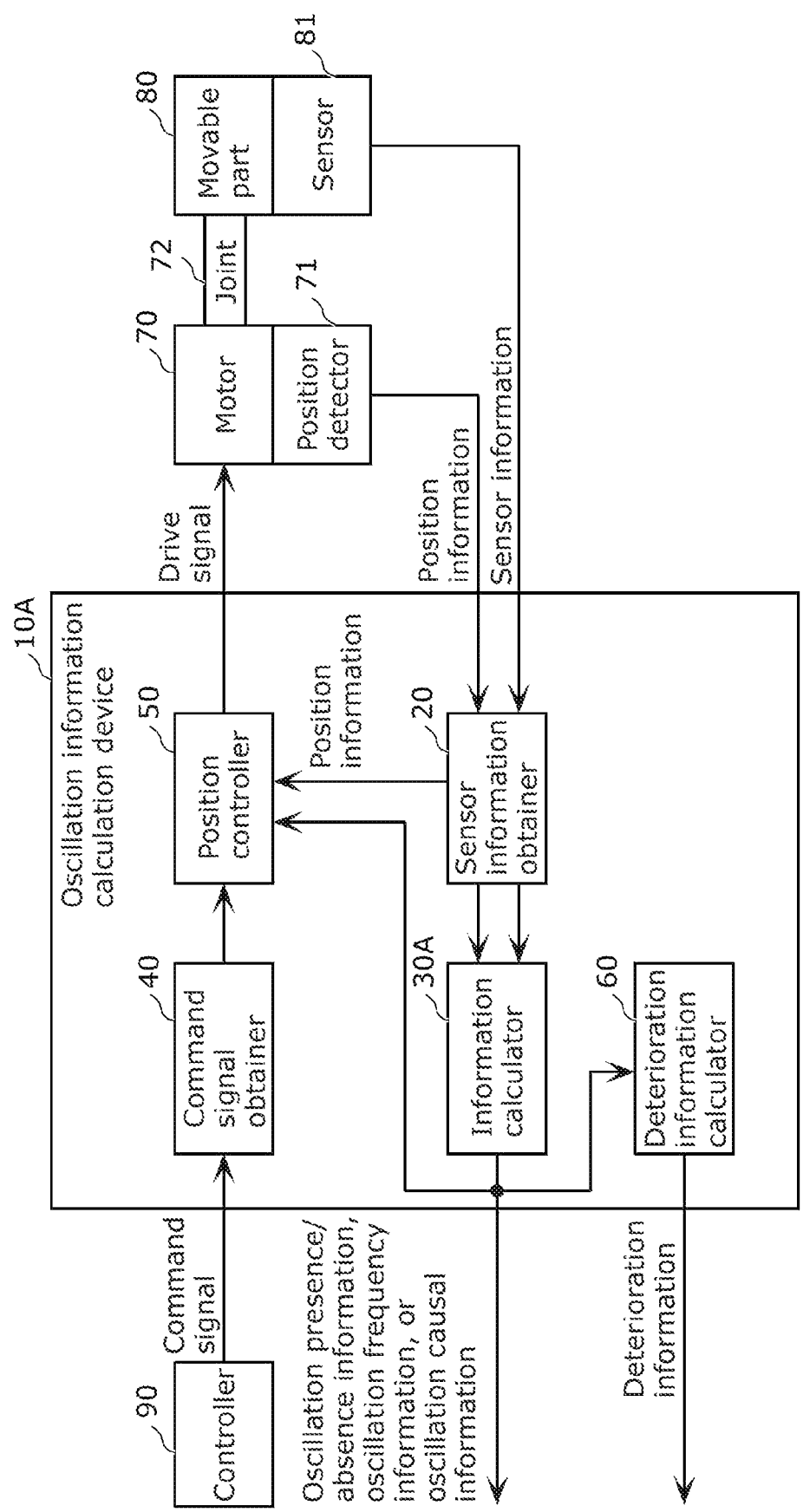
FIG. 6 is a block diagram showing a configuration of a motor control system according to Embodiment 2.

FIG. 6 is a block diagram showing a configuration of motor control system 1A according to Embodiment 2.

As shown in FIG. 6, different from motor control system 1 according to Embodiment 1, motor control system 1A includes oscillation information calculation device 10A in place of oscillation information calculation device 10. Different from oscillation information calculation device 10, oscillation information calculation device 10A includes information calculator 30A in place of information calculator 30.

Like information calculator 30, information calculator 30A calculates and outputs at least one of oscillation presence/absence information, oscillation frequency information, or oscillation causal information, based on the time series position information and time series sensor information obtained by sensor information obtainer 20. In order to calculate such information, however, information calculator 30A uses a partially modified algorithm of information calculator 30.

An example will be described here where information calculator 30A calculates and outputs oscillation presence/absence information, oscillation frequency information, and oscillation causal information, like information calculator 30.

Figure 7:
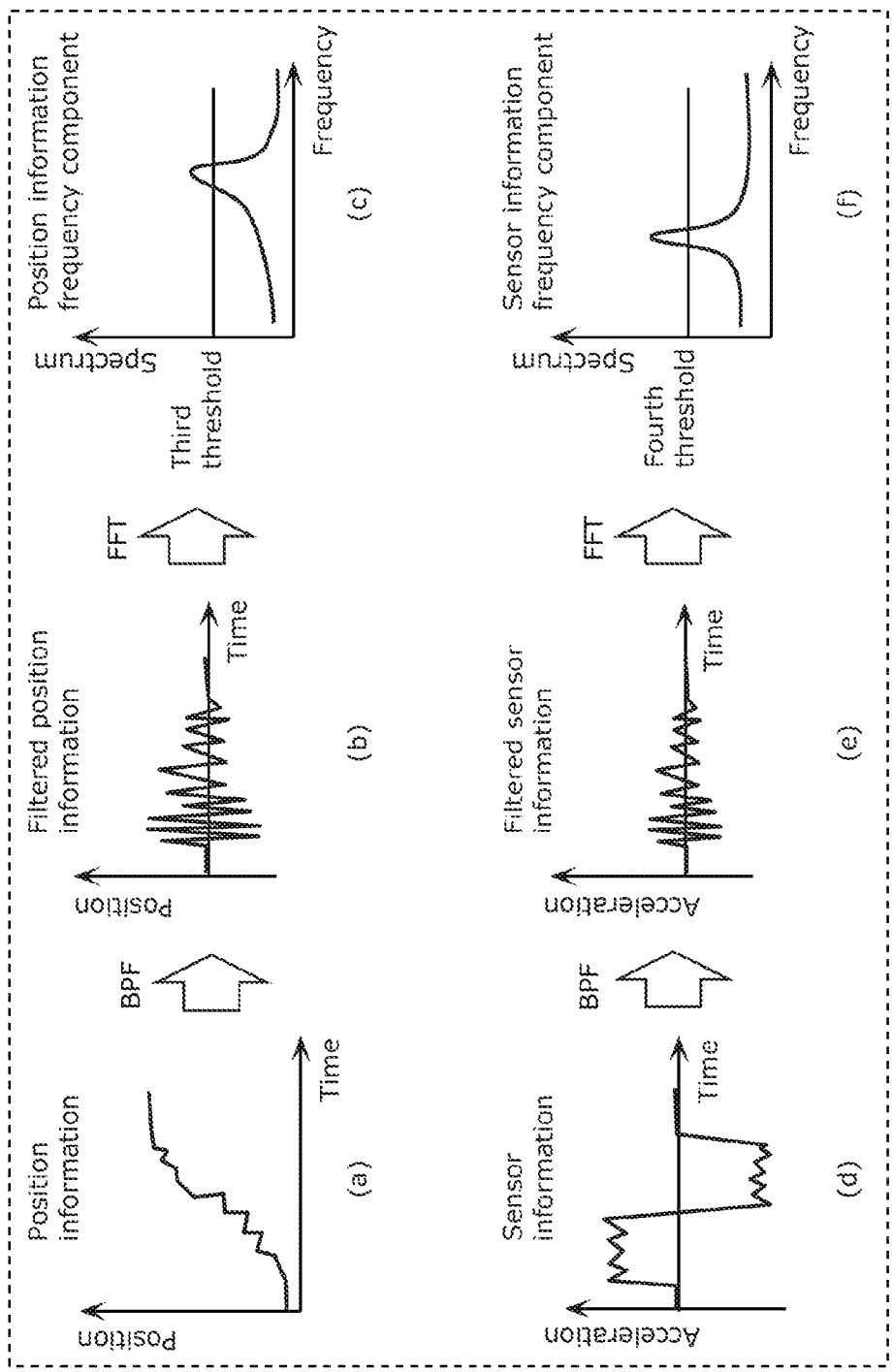
FIG. 7 is a schematic diagram showing where an information calculator according to Embodiment 2 calculates oscillation presence/absence information, oscillation frequency information, and oscillation causal information.

FIG. 7 is a schematic diagram showing that information calculator 30A calculates oscillation presence/absence information, oscillation frequency information, and oscillation causal information, based on time series position information and time series sensor information.

In FIG. 7, (a) schematically shows an example of the time series position information obtained by sensor information obtainer 20. In FIG. 7, (d) schematically shows an example of the time series sensor information obtained by sensor information obtainer 20.

Like information calculator 30, information calculator 30A applies a band pass filter, which allows a specific frequency component to pass, to the time series position information obtained by sensor information obtainer 20 to calculate filtered position information.

In FIG. 7, (b) schematically shows an example of the filtered position information calculated by information calculator 30A.

Like information calculator 30, information calculator 30A performs the Fourier transform on the calculated filtered position information to calculate a position information frequency component.

In FIG. 7, (c) schematically shows an example of the position information frequency component calculated by information calculator 30A.

Information calculator 30A checks whether the spectrum peak of the calculated position information frequency component is higher than or equal to a third threshold.

In FIG. 7, (c) shows an example where the spectrum peak of the calculated position information frequency component is higher than or equal to the third threshold.

Here, the third threshold is for determining whether the time series position information contains an oscillation component. For example, the third threshold may be determined based on a result of experiment or simulation performed in advance using equipment employing motor control system 1A or may be determined based on required performance of this equipment.

Like information calculator 30, information calculator 30A applies a band pass filter, which allows a specific frequency component to pass, to the time series sensor information obtained by sensor information obtainer 20 to calculate filtered sensor information.

In FIG. 7, (e) schematically shows an example of the filtered sensor information calculated by information calculator 30A.

Like information calculator 30, information calculator 30A performs the Fourier transform on the calculated filtered sensor information to calculate a sensor information frequency component.

In FIG. 7, (f) schematically shows an example of the sensor information frequency component calculated by information calculator 30A.

Information calculator 30A checks whether the spectrum peak of the calculated sensor information frequency component is higher than or equal to a fourth threshold.

In FIG. 7, (f) shows an example where the spectrum peak of the calculated sensor information frequency component is higher than or equal to the fourth threshold.

Here, the fourth threshold is for determining whether the time series sensor information contains an oscillation component. For example, the fourth threshold may be determined based on a result of experiment or simulation performed in advance using equipment employing motor control system 1A or may be determined based on required performance of this equipment.

Assume that the spectrum peak of the calculated position information frequency component is higher than or equal to the third threshold and/or the spectrum peak of the calculated sensor information frequency component is higher than or equal to the fourth threshold. In this case, information calculator 30A generates and outputs oscillation presence/absence information indicating the presence of oscillation of motor 70 and movable part 80. Otherwise, information calculator 30A generates and outputs oscillation presence/absence information indicating the absence of oscillation of motor 70 and movable part 80.

Information calculator 30A generates and outputs oscillation frequency information indicating, as the oscillation frequency of motor 70 and movable part 80, the frequencies of the spectrum peaks of the calculated position information frequency component and the calculated sensor information frequency component.

Information calculator 30A generates oscillation causal information based on the relationship between the position information frequency component and the third threshold, and the relationship between the sensor information frequency component and the fourth threshold.

FIG. 8 is a schematic diagram showing generation conditions where information calculator 30A generates oscillation causal information.

Assume that the spectrum peak of the calculated position information frequency component is higher than or equal to the third threshold. In this case, as shown in FIG. 8, information calculator 30A generates and outputs oscillation causal information. The oscillation causal information indicates that the cause of the oscillation of motor 70 and movable part 80 is a resonance-based cause arising from a resonance relationship between a command signal and the oscillation frequency of the equipment employing motor control system 1A.

Assume that the spectrum peak of the calculated position information frequency component is not higher than or equal to the third threshold and the spectrum peak of the calculated sensor information frequency component is higher than or equal to the fourth threshold. In this case, information calculator 30A generates and outputs oscillation causal information. The oscillation causal information indicates that the cause of the oscillation of motor 70 and movable part 80 is an anti-resonance-based cause arising from an anti-resonance relationship between a command signal and the oscillation frequency of the equipment employing motor control system 1A.

Assume that the spectrum peak of the calculated position information frequency component is not higher than or equal to the third threshold and the spectrum peak of the calculated sensor information frequency component is not higher than or equal to the fourth threshold. In this case, information calculator 30A generates and outputs oscillation causal information indicating that there is no cause of the oscillation of motor 70 and movable part 80.

Operation

Now, an operation performed by oscillation information calculation device 10A with the configuration described above will be described.

Oscillation information calculation device 10A performs second oscillation information calculation processing which is obtained by partially modifying the first oscillation information calculation processing according to Embodiment 1.

Figure 9:
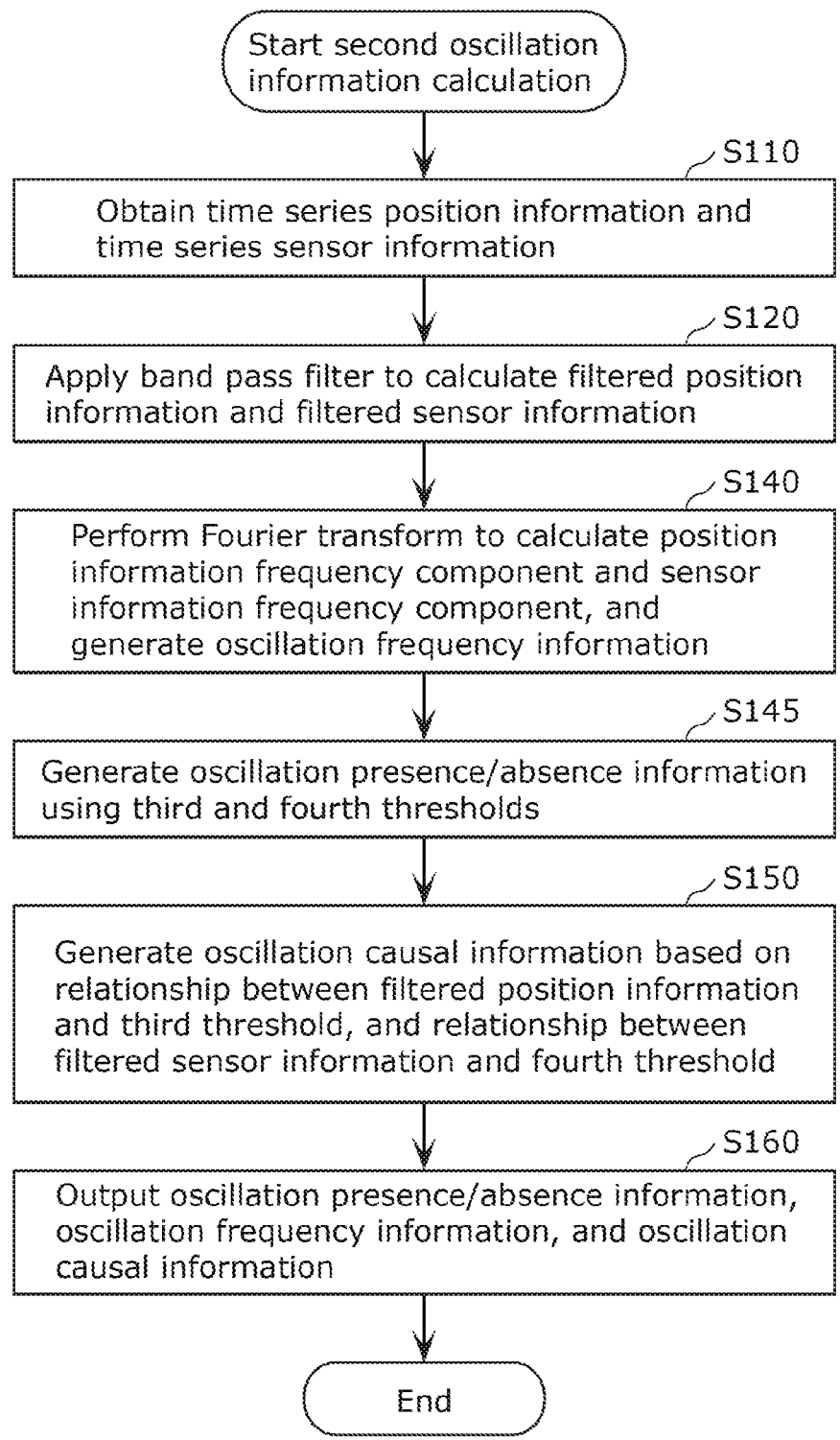
FIG. 9 is a flowchart of second oscillation information calculation processing according to Embodiment 2.

FIG. 9 is a flowchart of the second oscillation information calculation processing performed by oscillation information calculation device 10A.

The processing in steps S110, S120, and S160 in the second oscillation information calculation processing are the same as the processing in steps S10, S20, and S60 in the first oscillation information calculation processing according to Embodiment 1, respectively. That is, the processing in these steps is to be read as the processing in steps S10, S20, and S60 in the first oscillation information calculation processing with information calculator 30 replaced with information calculator 30A, and oscillation information calculation device 10 replaced with oscillation information calculation device 10A. The processing in steps S140 and S150 will thus be described mainly.

After the end of the processing in step S120, information calculator 30A performs the Fourier transform on the filtered position information and the filtered sensor information to calculate a position information frequency component and a sensor information frequency component. Information calculator 30A then generates oscillation frequency information indicating the frequencies of the spectrum peaks of the calculated information frequency component and the calculated sensor information frequency component (step S140).

After generating the oscillation frequency information, information calculator 30A conducts the following checks and generates oscillation presence/absence information (step S145). One of the checks is as to whether the spectrum peak of the calculated position information frequency component is higher than or equal to the third threshold. The other is as to whether the spectrum peak of the calculated sensor information frequency component is higher than or equal to the fourth threshold.

After generating the oscillation information, information calculator 30A generates the following information (step S150). Assume that the spectrum peak of the position information frequency component is higher than or equal to the third threshold. In this case, information calculator 30A generates oscillation causal information indicating a resonance-based cause. Assume that the spectrum peak of the position information frequency component is not higher than or equal to the third threshold and the spectrum peak of the sensor information frequency component is higher than or equal to the fourth threshold. In this case, information calculator 30A generates oscillation causal information indicating an anti-resonance-based cause. Assume that the spectrum peak of the position information frequency component is not higher than or equal to the third threshold and the spectrum peak of the sensor information frequency component is not higher than or equal to the fourth threshold. In this case, information calculator 30A generates oscillation causal information indicating that there is no cause.

After the end of the processing in step S150, the process proceeds to processing in step S160.

After the end of the processing in step S160, oscillation information calculation device 10A ends its second oscillation information calculation processing.

Study

As described above, like oscillation information calculation device 10 according to Embodiment 1, oscillation information calculation device 10A with the configuration described above outputs at least one of oscillation presence/absence information, oscillation frequency information, or oscillation causal information. The oscillation presence/absence information indicates the presence or absence of oscillation of motor 70 and movable part 80. The oscillation frequency information indicates the oscillation frequency of motor 70 and movable part 80. The oscillation causal information indicates the cause of the oscillation of motor 70 and movable part 80.

Embodiment 3

Described below is a motor control system according to Embodiment 3 obtained by partially modifying motor control system 1 according to Embodiment 1.

The components of the motor control system according to Embodiment 3, which are the same as those of motor control system 1 according to Embodiment 1, are regarded as being described already. In the following description, the same reference signs are used to represent substantially the same components and detailed description thereof will be omitted. Differences from motor control system 1 will be described mainly.

Figure 10:
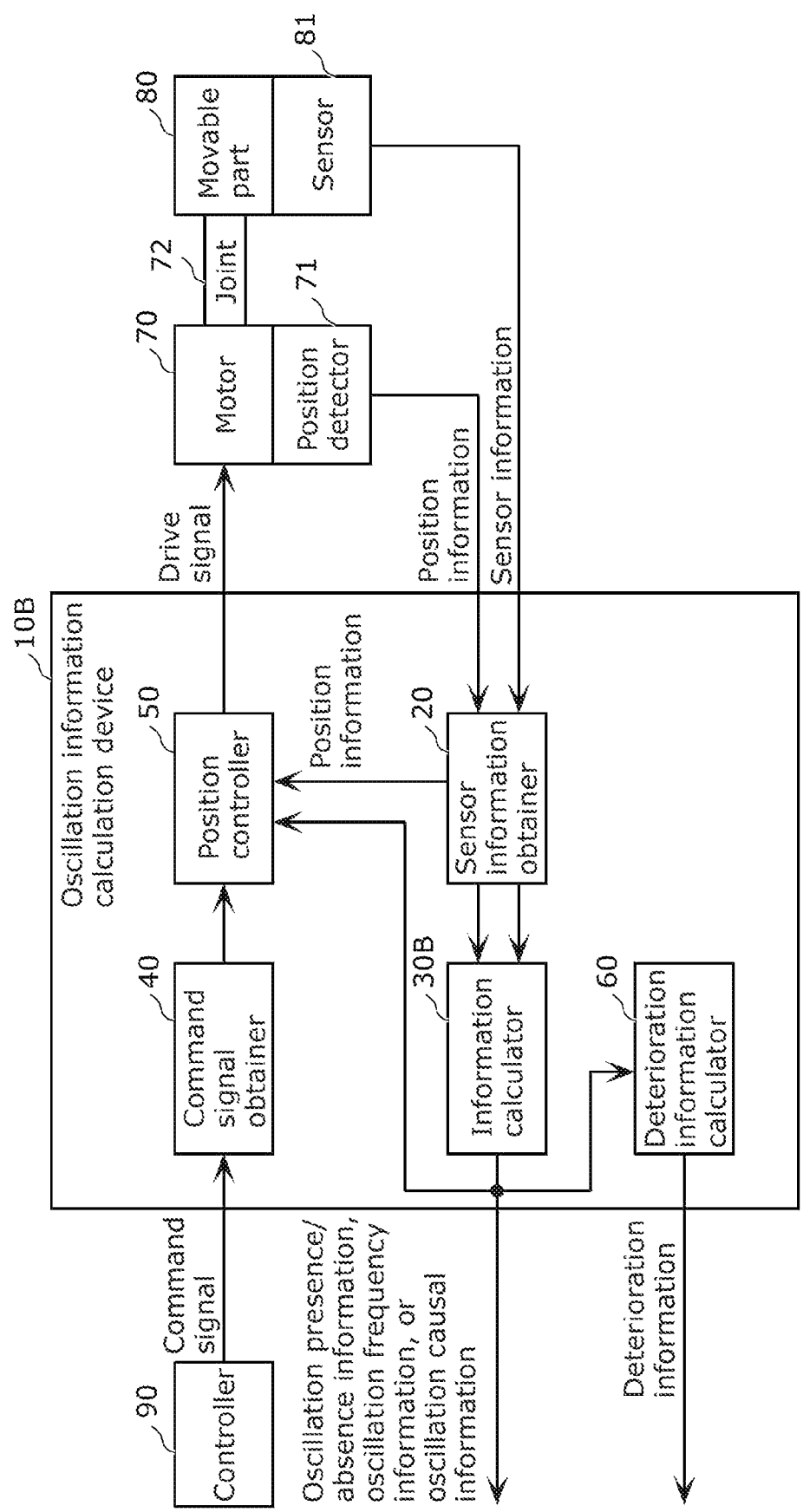
FIG. 10 is a block diagram showing a configuration of a motor control system according to Embodiment 3.

FIG. 10 is a block diagram showing a configuration of motor control system 1B according to Embodiment 3.

As shown in FIG. 10, different from motor control system 1 according to Embodiment 1, motor control system 1B includes oscillation information calculation device 10B in place of oscillation information calculation device 10. Different from oscillation information calculation device 10, oscillation information calculation device 10B includes information calculator 30B in place of information calculator 30.

Like information calculator 30, information calculator 30B calculates and outputs at least one of oscillation presence/absence information, oscillation frequency information, or oscillation causal information, based on the time series position information and time series sensor information obtained by sensor information obtainer 20. In order to calculate such information, however, information calculator 30B uses a partially modified algorithm of information calculator 30.

An example will be described here where information calculator 30B calculates and outputs oscillation presence/absence information, oscillation frequency information, and oscillation causal information, like information calculator 30.

Figure 11:
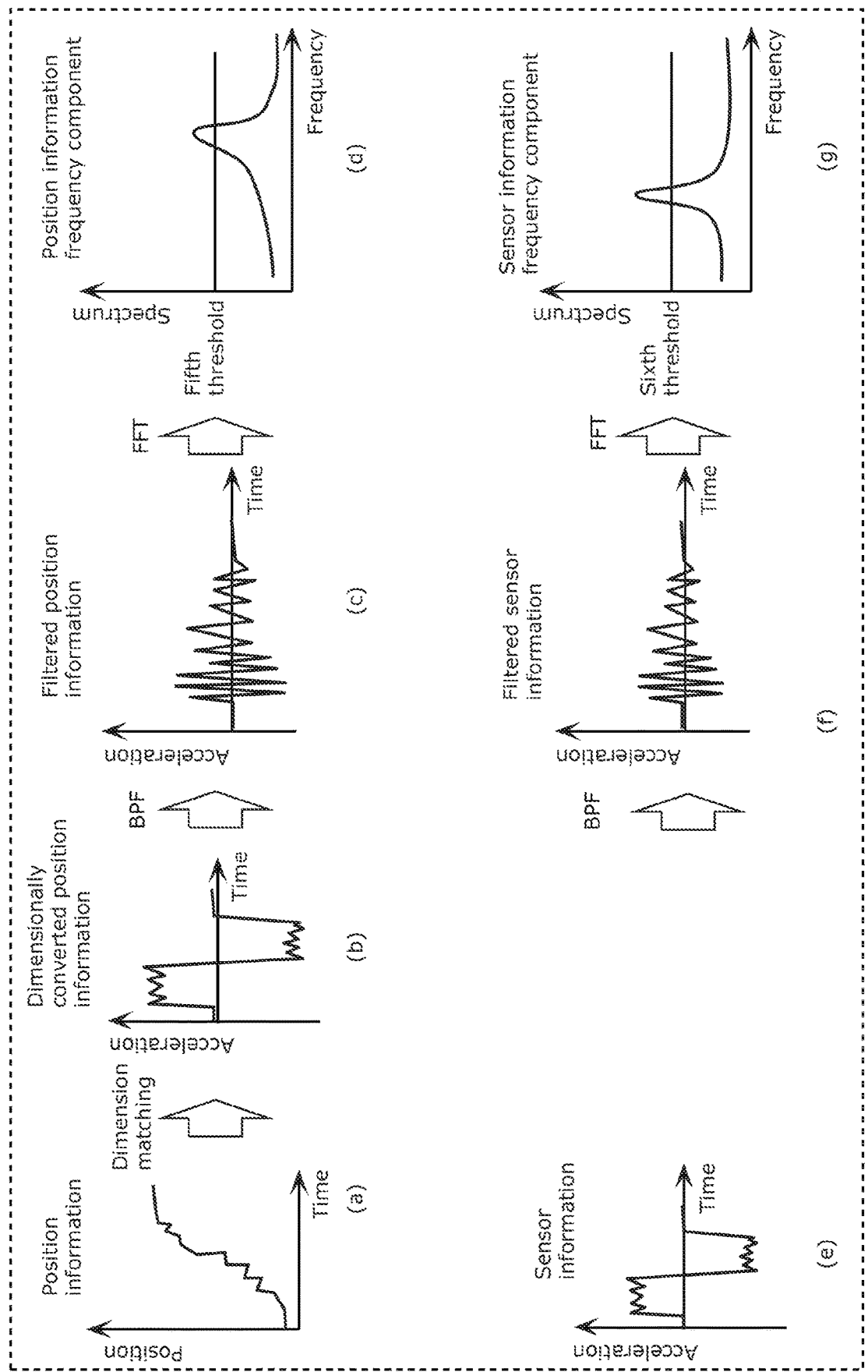
FIG. 11 is a schematic diagram showing that an information calculator according to Embodiment 3 calculates oscillation presence/absence information, oscillation frequency information, and oscillation causal information.

FIG. 11 is a schematic diagram showing that information calculator 30B calculates oscillation presence/absence information, oscillation frequency information, and oscillation causal information, based on time series position information and time series sensor information.

In FIG. 11, (a) schematically shows an example of the time series position information obtained by sensor information obtainer 20. In FIG. 11, (e) schematically shows an example of the time series sensor information obtained by sensor information obtainer 20.

Information calculator 30B causes the matching between the dimensions of the position information and the sensor information. An example will be described here where the dimension of the position information matches with the dimension of the sensor information. Alternatively, the dimension of the sensor information may match with the dimension of the position information. The dimensions of the position information and the sensor information may match with another dimension.

The dimension of the position information corresponds to the dimension of the position, and the dimension of the sensor information corresponds to the dimension of the acceleration. Information calculator 30B performs thus second order differential of the position information in time to convert the position information into dimensionally converted position information in the dimension of the acceleration.

In FIG. 11, (b) schematically shows an example of the dimensionally converted position information in the dimension of the acceleration converted by information calculator 30B.

Information calculator 30B applies a band pass filter, which allows a specific frequency component to pass, to the dimensionally converted position information to calculate filtered position information.

In FIG. 11, (c) schematically shows an example of the filtered position information calculated by information calculator 30B.

Like information calculator 30, information calculator 30B performs the Fourier transform on the calculated filtered position information to calculate a position information frequency component. In FIG. 11, (d) schematically shows an example of the position information frequency component calculated by information calculator 30B.

Information calculator 30B checks whether the spectrum peak of the calculated position information frequency component is higher than or equal to a fifth threshold.

In FIG. 11, (d) shows an example where the spectrum peak of the calculated position information frequency component is higher than or equal to the fifth threshold.

Here, the fifth threshold is for determining whether the time series position information contains an oscillation component. For example, the fifth threshold may be determined based on a result of experiment or simulation performed in advance using equipment employing motor control system 1B or may be determined based on required performance of this equipment.

Like information calculator 30, information calculator 30B applies a band pass filter, which allows a specific frequency component to pass, to the time series sensor information obtained by sensor information obtainer 20 to calculate filtered sensor information.

In FIG. 11, (f) schematically shows an example of the filtered sensor information calculated by information calculator 30B.

Like information calculator 30, information calculator 30B performs the Fourier transform on the calculated filtered sensor information to calculate a sensor information frequency component.

In FIG. 11, (g) schematically shows an example of the sensor information frequency component calculated by information calculator 30B.

Information calculator 30B checks whether the spectrum peak of the calculated sensor information frequency component is higher than or equal to a sixth threshold.

In FIG. 11, (g) shows an example where the spectrum peak of the calculated sensor information frequency component is higher than or equal to the sixth threshold.

Here, the sixth threshold is for determining whether the time series sensor information contains an oscillation component. For example, the sixth threshold may be determined based on a result of experiment or simulation performed in advance using equipment employing motor control system 1B or may be determined based on required performance of this equipment.

Assume that the spectrum peak of the calculated position information frequency component is higher than or equal to the fifth threshold and/or the spectrum peak of the calculated sensor information frequency component is higher than or equal to the sixth threshold. In this case, information calculator 30B generates and outputs oscillation presence/absence information indicating the presence of oscillation of motor 70 and movable part 80. Otherwise, information calculator 30B generates and outputs oscillation presence/absence information indicating the absence of oscillation of motor 70 and movable part 80.

Information calculator 30B generates and outputs oscillation frequency information indicating, as the oscillation frequency of motor 70 and movable part 80, the frequencies of the spectrum peaks of the calculated position information frequency component and the calculated sensor information frequency component.

Information calculator 30B generates oscillation causal information based on the relationship between the position information frequency component and the fifth threshold, and the relationship between the sensor information frequency component and the sixth threshold.

FIG. 12 is a schematic diagram showing generation conditions where information calculator 30B generates oscillation causal information.

Assume that the spectrum peak of the calculated position information frequency component is higher than or equal to the fifth threshold. In this case, as shown in FIG. 12, information calculator 30B generates and outputs oscillation causal information. The oscillation causal information indicates that the cause of the oscillation of motor 70 and movable part 80 is a resonance-based cause arising from a resonance relationship between a command signal and the oscillation frequency of the equipment employing motor control system 1B.

Assume that the spectrum peak of the calculated position information frequency component is not higher than or equal to the fifth threshold and the spectrum peak of the calculated sensor information frequency component is higher than or equal to the sixth threshold. In this case, information calculator 30B generates and outputs oscillation causal information. The oscillation causal information indicates that the cause of the oscillation of motor 70 and movable part 80 is an anti-resonance-based cause arising from an anti-resonance relationship between a command signal and the oscillation frequency of the equipment employing motor control system 1B.

Assume that the spectrum peak of the calculated position information frequency component is not higher than or equal to the fifth threshold and the spectrum peak of the calculated sensor information frequency component is not higher than or equal to the sixth threshold. In this case, information calculator 30B generates and outputs oscillation causal information indicating that there is no cause of the oscillation of motor 70 and movable part 80.

Operation

Now, an operation performed by oscillation information calculation device 10B with the configuration described above will be described.

Oscillation information calculation device 10B preforms third oscillation information calculation processing which is obtained by partially modifying the first oscillation information calculation processing according to Embodiment 1.

Figure 13:
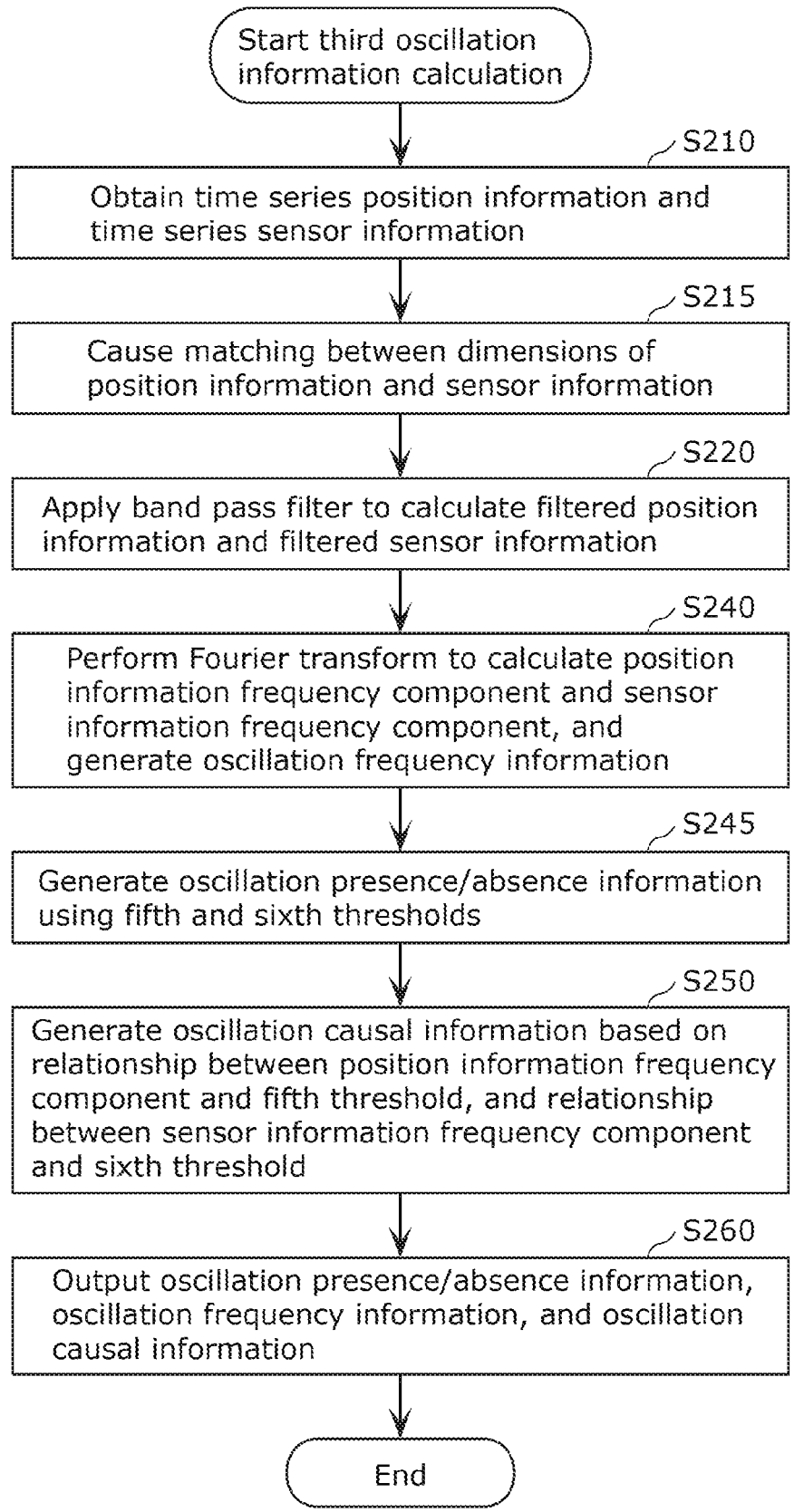
FIG. 13 is a flowchart of third oscillation information calculation processing according to Embodiment 3.

FIG. 13 is a flowchart of the third oscillation information calculation processing performed by oscillation information calculation device 10B.

The processing in steps S210 and S260 in the third oscillation information calculation processing are the same as the processing in steps S10 and S60 in the first oscillation information calculation processing according to Embodiment 1, respectively. That is, the processing in these steps is to be read as the processing in steps S10 and S60 in the first oscillation information calculation processing with information calculator 30 replaced with information calculator 30B, and oscillation information calculation device 10 replaced with oscillation information calculation device 10B. The processing in steps S215 to S250 will thus be described mainly.

After the end of the processing in step S210, information calculator 30B causes the matching between the dimensions of the position information and the sensor information (step S215). Here, information calculator 30B performs second order differential of the position information in time to convert the position information into dimensionally converted position information in the dimension of the acceleration.

After obtaining the dimensionally converted position information, information calculator 30B applies a band pass filter, which allows a specific frequency component to pass, to the time series dimensionally converted position information and the time series sensor information to calculate filtered position information and filtered sensor information (step S220).

After calculating the filtered position information and the filtered sensor information, information calculator 30B performs the Fourier transform on the filtered position information and the filtered sensor information to calculate a position information frequency component and a sensor information frequency component. Information calculator 30B then generates oscillation frequency information indicating the frequencies of the spectrum peaks of the calculated information frequency component and the calculated sensor information frequency component (step S240).

After generating the oscillation frequency information, information calculator 30B conducts the following checks and generates oscillation presence/absence information (step S245). One of the checks is as to whether the spectrum peak of the calculated position information frequency component is higher than or equal to the fifth threshold. The other is as to whether the spectrum peak of the calculated sensor information frequency component is higher than or equal to the sixth threshold.

After generating the oscillation frequency information, information calculator 30B generates the following information (step S250). Assume that the spectrum peak of the position information frequency component is higher than or equal to the fifth threshold. In this case, information calculator 30B generates oscillation causal information indicating a resonance-based cause. Assume that the spectrum peak of the position information frequency component is not higher than or equal to the fifth threshold and the spectrum peak of the sensor information frequency component is higher than or equal to the sixth threshold. In this case, information calculator 30B generates oscillation causal information indicating an anti-resonance-based cause. Assume that the spectrum peak of the position information frequency component is not higher than or equal to the fifth threshold and the spectrum peak of the sensor information frequency component is not higher than or equal to the sixth threshold. In this case, information calculator 30B generates oscillation causal information indicating that there is no cause.

After the end of the processing in step S250, the process proceeds to processing in step S260.

After the end of the processing in step S260, oscillation information calculation device 10B ends its third oscillation information calculation processing.

Study

As described above, like oscillation information calculation device 10 according to Embodiment 1, oscillation information calculation device 10B with the configuration described above outputs at least one of oscillation presence/absence information, oscillation frequency information, or oscillation causal information. The oscillation presence/absence information indicates the presence or absence of oscillation of motor 70 and movable part 80. The oscillation frequency information indicates the oscillation frequency of motor 70 and movable part 80. The oscillation causal information indicates the cause of the oscillation of motor 70 and movable part 80.

Embodiment 4

Described below is a motor control system according to Embodiment 4 obtained by partially modifying motor control system 1 according to Embodiment 1.

The components of the motor control system according to Embodiment 4, which are the same as those of motor control system 1 according to Embodiment 1, are regarded as being described already. In the following description, the same reference signs are used to represent substantially the same components and detailed description thereof will be omitted. Differences from motor control system 1 will be described mainly.

Figure 14:
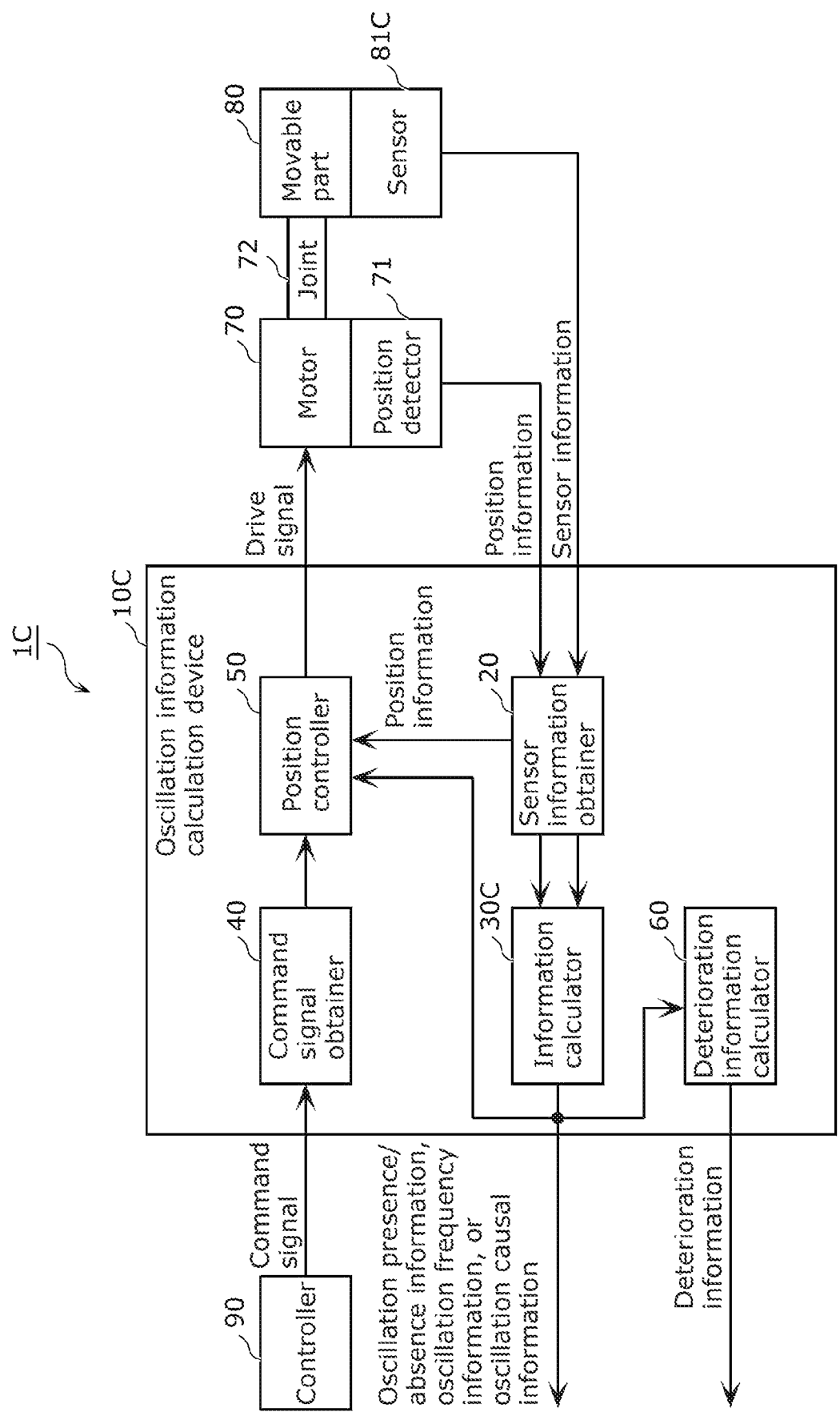
FIG. 14 is a block diagram showing a configuration of a motor control system according to Embodiment 4.

FIG. 14 is a block diagram showing a configuration of motor control system 1C according to Embodiment 4.

As shown in FIG. 14, different from motor control system 1 according to Embodiment 1, motor control system 1C includes oscillation information calculation device 10C in place of oscillation information calculation device 10 and sensor 81C in place of sensor 81. Different from oscillation information calculation device 10, oscillation information calculation device 10C includes information calculator 30C in place of information calculator 30.

Sensor 81C is a position sensor attached to movable part 80 so as to detect the position of movable part 80 as the physical quantity of movable part 80. More specifically, sensor 81C includes an imaging device, which captures an image within an imaging range. If the imaging range includes a target position, sensor 81C performs image processing on the captured image so as to calculate the deviation of movable part 80 from the target position.

Information calculator 30C calculates and outputs at least one of oscillation presence/absence information, oscillation frequency information, or oscillation causal information, based on the time series position information and time series sensor information obtained by sensor information obtainer 20.

An example will be described here where information calculator 30C calculates and outputs oscillation presence/absence information, oscillation frequency information, and oscillation causal information.

Figure 15:
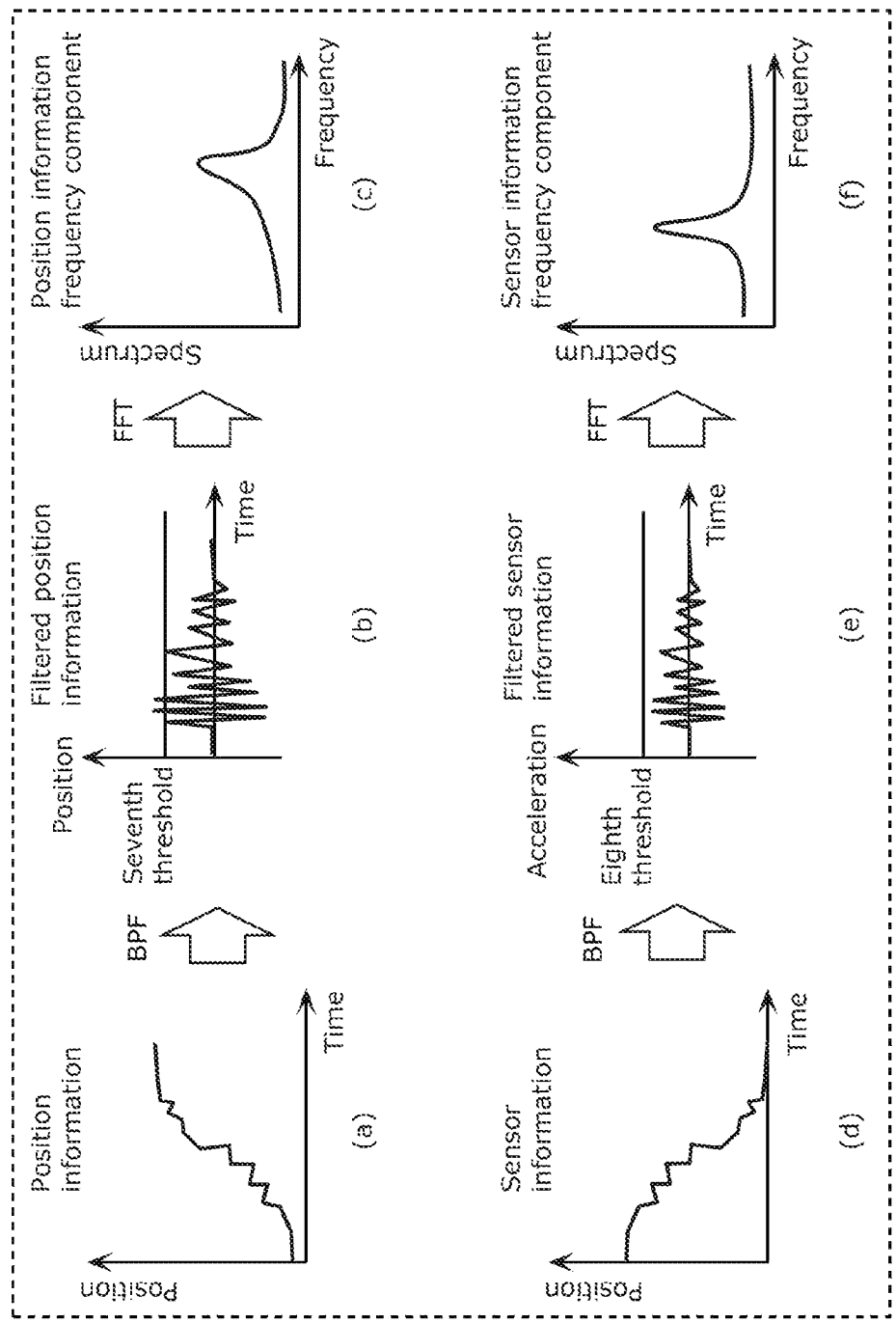
FIG. 15 is a schematic diagram showing that an information calculator according to Embodiment 4 calculates oscillation presence/absence information, oscillation frequency information, and oscillation causal information.

FIG. 15 is a schematic diagram showing that information calculator 30C calculates oscillation presence/absence information, oscillation frequency information, and oscillation causal information, based on time series position information and time series sensor information.

In FIG. 15, (a) schematically shows an example of the time series position information obtained by sensor information obtainer 20. In FIG. 15, (d) schematically shows an example of the time series sensor information obtained by sensor information obtainer 20. Like information calculator 30, information calculator 30C applies a band pass filter, which allows a specific frequency component to pass, to the time series position information obtained by sensor information obtainer 20 to calculate filtered position information.

In FIG. 15, (b) schematically shows an example of the filtered position information calculated by information calculator 30C.

Information calculator 30C checks whether the amplitude according to the calculated filtered position information is greater than or equal to a seventh threshold.

In FIG. 15, (b) shows an example where the amplitude according to the calculated filtered position information is greater than or equal to the seventh threshold.

Here, the seventh threshold is for determining whether the time series position information contains an oscillation component. For example, the seventh threshold may be determined based on a result of experiment or simulation performed in advance using equipment employing motor control system 1C or may be determined based on required performance of this equipment.

Like information calculator 30, information calculator 30C performs the Fourier transform on the calculated filtered position information to calculate a position information frequency component.

In FIG. 15, (c) schematically shows an example of the position information frequency component calculated by information calculator 30C.

Like information calculator 30, information calculator 30C applies a band pass filter, which allows a specific frequency component to pass, to the time series sensor information obtained by sensor information obtainer 20 to calculate filtered sensor information.

In FIG. 15, (e) schematically shows an example of the filtered sensor information calculated by information calculator 30C.

Information calculator 30C checks whether the amplitude according to the calculated filtered sensor information is greater than or equal to an eighth threshold.

In FIG. 15, (e) shows an example where the amplitude according to the calculated filtered sensor information is not greater than or equal to the eighth threshold.

Here, the eighth threshold is for determining whether the time series sensor information contains an oscillation component. For example, the eighth threshold may be determined based on a result of experiment or simulation performed in advance using equipment employing motor control system 1C or may be determined based on required performance of this equipment.

Like information calculator 30, information calculator 30C performs the Fourier transform on the calculated filtered sensor information to calculate a sensor information frequency component.

In FIG. 15, (f) schematically shows an example of the sensor information frequency component calculated by information calculator 30C.

Assume that the amplitude according to the calculated filtered position information is greater than or equal to the seventh threshold and/or the amplitude according to the calculated filtered sensor information is greater than or equal to the eighth threshold. In this case, information calculator 30C generates and outputs oscillation presence/absence information indicating the presence of oscillation of motor 70 and movable part 80. Otherwise, information calculator 30C generates and outputs oscillation presence/absence information indicating the absence of oscillation of motor 70 and movable part 80.

Information calculator 30C generates and outputs oscillation frequency information indicating, as the oscillation frequency of motor 70 and movable part 80, the frequencies of the spectrum peaks of the calculated position information frequency component and the calculated sensor information frequency component.

Information calculator 30C generates oscillation causal information based on the relationship between the filtered position information and the seventh threshold, and the relationship between the filtered sensor information and the eighth threshold.

FIG. 16 is a schematic diagram showing generation conditions where information calculator 30C generates oscillation causal information.

Assume that the amplitude according to the calculated filtered position information is greater than or equal to the seventh threshold. In this case, as shown in FIG. 16, information calculator 30C generates and outputs oscillation causal information. The oscillation causal information indicates that the cause of the oscillation of motor 70 and movable part 80 is a resonance-based cause arising from a resonance relationship between a command signal and the oscillation frequency of the equipment employing motor control system 1C.

Assume that the amplitude according to the calculated filtered position information is not greater than or equal to the seventh threshold and the amplitude according to the calculated filtered sensor information is greater than or equal to the eighth threshold. In this case, information calculator 30C generates and outputs oscillation causal information. The oscillation causal information indicates that the cause of the oscillation of motor 70 and movable part 80 is an anti-resonance-based cause arising from an anti-resonance relationship between a command signal and the oscillation frequency of the equipment employing motor control system 1C.

Assume that the amplitude according to the calculated filtered position information is not greater than or equal to the seventh threshold and the amplitude according to the calculated filtered sensor information is not greater than or equal to the eighth threshold.

In this case, information calculator 30C generates and outputs oscillation causal information indicating that there is no cause of the oscillation of motor 70 and movable part 80.

[Operation]

Now, an operation performed by oscillation information calculation device 10C with the configuration described above will be described.

Oscillation information calculation device 10C performs fourth oscillation information calculation processing which is obtained by partially modifying the first oscillation information calculation processing according to Embodiment 1.

FIG. 17 is a flowchart of the fourth oscillation information calculation processing performed by oscillation information calculation device 10C.

The processing in steps S410, S420, S440, and S460 in the fourth oscillation information calculation processing are the same as the processing in steps S10, S20, S40, and S60 in the first oscillation information calculation processing according to Embodiment 1, respectively. That is, the processing in these steps is to be read as the processing in steps S10, S20, S40, and S60 in the first oscillation information calculation processing with information calculator 30 replaced with information calculator 30C, oscillation information calculation device 10 replaced with oscillation information calculation device 10C, and sensor 81 replaced with sensor 81C. The processing in steps S430 and S450 will thus be described mainly.

After the end of the processing in step S420, information calculator 30C conducts the following checks and generates oscillation presence/absence information (step S430). One of the checks is as to whether the amplitude according to the filtered position information is greater than or equal to the seventh threshold. The other is as to whether the amplitude according to the filtered sensor information is greater than or equal to the eighth threshold.

After the end of the processing in step S430, the process proceeds to processing in step S440.

After the end of the processing in step S440, information calculator 30C generates the following information (step S450). Assume that the amplitude according to the filtered position information is greater than or equal to the seventh threshold. In this case, information calculator 30C generates oscillation causal information indicating a resonance-based cause. Assume that the amplitude according to the filtered position information is not greater than or equal to the seventh threshold and the amplitude according to the filtered sensor information is greater than or equal to the eighth threshold. In this case, information calculator 30C generates oscillation causal information indicating an anti-resonance-based cause. Assume that the amplitude according to the filtered position information is not greater than or equal to the seventh threshold and the amplitude according to the filtered sensor information is not greater than or equal to the eighth threshold. In this case, information calculator 30C generates oscillation causal information indicating that there is no cause.

After the end of the processing in step S450, the process proceeds to processing in step S460.

After the end of the processing in step S460, oscillation information calculation device 10C ends its fourth oscillation information calculation processing.

[Study]

As described above, like oscillation information calculation device 10 according to Embodiment 1, oscillation information calculation device 10C with the configuration described above outputs at least one of oscillation presence/absence information, oscillation frequency information, or oscillation causal information. The oscillation presence/absence information indicates the presence or absence of oscillation of motor 70 and movable part 80. The oscillation frequency information indicates the oscillation frequency of motor 70 and movable part 80. The oscillation causal information indicates the cause of the oscillation of motor 70 and movable part 80.

[Remarks]

While examples of the technique disclosed in this application have been described above based on Embodiments 1 to 4, the present disclosure is not limited to Embodiments 1 to 4. One or more aspect of the present disclosure may include forms obtained by various modifications to the foregoing embodiments that can be conceived by those skilled in the art or forms achieved by freely combining the constituent elements and functions in the foregoing embodiments without departing from the scope and spirit of the present disclosure.

An aspect of the present disclosure may be directed not only to such oscillation information calculation device 10, for example, but also to an oscillation information calculation method including, as steps, characteristic components of oscillation information calculation device 10, for example. An aspect of the present disclosure may also be directed to a computer program causing a computer to execute characteristic steps included in the oscillation information calculation method. An aspect of the present disclosure may also be directed to a non-transitory computer-readable recording medium having recorded thereon such a computer program.

Industrial Applicability

The present disclosure is widely applicable to a system, for example, which calculates information on oscillation.

The invention claimed is:

1. An oscillation information calculation device comprising:
    a sensor information obtainer that obtains time series position information on a motor as detected by a position detector, and time series sensor information on a movable part as detected by a sensor attached to the movable part, the movable part being connected to the motor via a joint; and
    an information calculator that calculates and outputs at least one of oscillation presence/absence information, oscillation frequency information, or oscillation causal information, based on the time series position information and the time series sensor information, the oscillation presence/absence information indicating presence or absence of oscillation of the motor and the movable part, the oscillation frequency information indicating an oscillation frequency of the motor and the movable part, the oscillation causal information indicating a cause of an oscillation of the motor and the movable part,
    wherein the cause indicated by the oscillation causal information includes at least one of:
    a resonance-based cause arising from a resonance relationship between a command signal for moving the movable part to a target position and an oscillation frequency of equipment including the motor and the movable part; or
    an anti-resonance-based cause arising from an anti-resonance relationship between the command signal and the oscillation frequency.

2. The oscillation information calculation device according to claim 1, wherein
    the information calculator calculates the at least one of the oscillation presence/absence information, the oscillation frequency information, or the oscillation causal information, further based on a predetermined threshold.

3. The oscillation information calculation device according to claim 1, further comprising:
    a command signal obtainer that obtains a command signal for moving the movable part to a target position; and
    a position controller that generates a drive signal for driving the motor to move the movable part to the target position, based on the command signal and the time series position information, and outputs the drive signal generated to the motor, wherein
    the position controller updates a gain parameter for determining a gain of the drive signal relative to the command signal, based on the at least one of the oscillation presence/absence information, the oscillation frequency information, or the oscillation causal information.

4. The oscillation information calculation device according to claim 1, wherein
    the information calculator calculates the at least one of the oscillation presence/absence information, the oscillation frequency information, or the oscillation causal information in a first time period based on the time series position information on the motor as detected by the position detector in the first time period, and the time series sensor information on the movable part as detected by the sensor in the first time period, and calculates the at least one of the oscillation presence/absence information, the oscillation frequency information, or the oscillation causal information in a second time period before the first time period based on the time series position information on the motor as detected by the position detector in the second time period, and the time series sensor information on the movable part as detected by the sensor in the second time period, and
    the oscillation information calculation device further comprises a deterioration information calculator that calculates and outputs deterioration information on a deterioration of equipment including the motor and the movable part based on the at least one of the oscillation presence/absence information, the oscillation frequency information, or the oscillation causal information in the first time period and the at least one of the oscillation presence/absence information, the oscillation frequency information, or the oscillation causal information in the second time period.

5. The oscillation information calculation device according to claim 1, wherein
    the sensor is an acceleration sensor that detects an acceleration of the movable part.

6. The oscillation information calculation device according to claim 1, wherein
    the sensor detects a deviation of a position of the movable part from a target position of the movable part.

7. The oscillation information calculation device according to claim 6, wherein
    the sensor includes an imaging device.

8. The oscillation information calculation device according to claim 1, wherein
    the sensor is attached to the movable part at a point displaced when the movable part oscillates.

9. An oscillation information calculation method comprising:
    obtaining time series position information on a motor as detected by a position detector, and time series sensor information on a movable part as detected by a sensor attached to the movable part, the movable part being connected to the motor via a joint; and
    calculating and outputting at least one of oscillation presence/absence information, oscillation frequency information, or oscillation causal information, based on the time series position information and the time series sensor information, the oscillation presence/absence information indicating presence or absence of oscillation of the motor and the movable part, the oscillation frequency information indicating an oscillation frequency of the motor and the movable part, the oscillation causal information indicating a cause of an oscillation of the motor and the movable part, wherein the cause indicated by the oscillation causal information includes at least one of:

a resonance-based cause arising from a resonance relationship between a command signal for moving the movable part to a target position and an oscillation frequency of equipment including the motor and the movable part; or an anti-resonance-based cause arising from an anti-resonance relationship between the command signal and the oscillation frequency.

10. A non-transitory computer-readable recording medium having recorded thereon a program for causing an oscillation information calculation device to execute oscillation information calculation processing including:

obtaining time series position information on a motor as detected by a position detector, and time series sensor information on a movable part as detected by a sensor attached to the movable part, the movable part being connected to the motor via a joint; and calculating and outputting at least one of oscillation presence/absence information, oscillation frequency information, or oscillation causal information, based on the time series position information and the time series sensor information, the oscillation presence/absence information indicating presence or absence of oscillation of the motor and the movable part, the oscillation frequency information indicating an oscillation frequency of the motor and the movable part, the oscillation causal information indicating a cause of an oscillation of the motor and the movable part, wherein the cause indicated by the oscillation causal information includes at least one of:

a resonance-based cause arising from a resonance relationship between a command signal for moving the movable part to a target position and an oscillation frequency of equipment including the motor and the movable part; or an anti-resonance-based cause arising from an anti-resonance relationship between the command signal and the oscillation frequency.

* * * * *